(12) United States Patent
Yasaki et al.

(10) Patent No.: US 8,484,735 B2
(45) Date of Patent: Jul. 9, 2013

(54) STATUS DISPLAY CONTROL APPARATUS

(75) Inventors: Kouichi Yasaki, Kawasaki (JP); Naoki Nishiguchi, Kawasaki (JP); Kazuaki Nimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 838 days.

(21) Appl. No.: 12/042,047

(22) Filed: Mar. 4, 2008

(65) Prior Publication Data

US 2008/0222446 A1   Sep. 11, 2008

(30) Foreign Application Priority Data

Mar. 6, 2007   (JP) ................. 2007-055966

(51) Int. Cl.
*G06F 21/04* (2006.01)
*G06F 7/04* (2006.01)
*G06F 11/00* (2006.01)

(52) U.S. Cl.
USPC ............ 726/24; 726/26; 726/30; 726/16; 726/22

(58) Field of Classification Search
USPC .............................. 726/16–26, 30
See application file for complete search history.

(56) References Cited

U.S. PATENT DOCUMENTS

| | | | | |
|---|---|---|---|---|
| 5,694,569 A * | 12/1997 | Fischer | ............ | 711/216 |
| 7,055,098 B2 * | 5/2006 | Hull et al. | ............ | 715/275 |
| 7,818,800 B1 * | 10/2010 | Lemley et al. | ............ | 726/22 |
| 2003/0221114 A1 | 11/2003 | Hino et al. | | |
| 2004/0054917 A1 * | 3/2004 | Obrecht et al. | ............ | 713/200 |
| 2004/0068664 A1 * | 4/2004 | Nachenberg et al. | ......... | 713/200 |
| 2005/0091486 A1 | 4/2005 | Avraham et al. | | |
| 2005/0091503 A1 | 4/2005 | Roberts et al. | | |
| 2006/0053277 A1 | 3/2006 | Wang et al. | | |
| 2006/0294380 A1 * | 12/2006 | Aissi | ............ | 713/172 |
| 2008/0133540 A1 * | 6/2008 | Hubbard et al. | ............ | 707/10 |

FOREIGN PATENT DOCUMENTS

| | | |
|---|---|---|
| JP | A 2003-271254 | 9/2003 |
| JP | 2005-129034 | 5/2005 |
| JP | 2005-129050 | 5/2005 |
| JP | A 2006-501581 | 1/2006 |
| JP | A 2006-79617 | 3/2006 |
| JP | 2006-191195 | 7/2006 |
| WO | WO 2004/034238 A2 | 4/2004 |
| WO | WO 2007/002954 | 1/2007 |

OTHER PUBLICATIONS

Security Chit (TPM), http://www-06.ibm.com/jp/pc/think/security/chip.shtml.

(Continued)

*Primary Examiner* — Catherine Thiaw
*Assistant Examiner* — S. Ali Zaidi
(74) *Attorney, Agent, or Firm* — Greer, Burns & Crain, Ltd.

(57) ABSTRACT an apparatus comprises a data display unit which causes a display device to output display data that indicates a drawing screen complying with the display request, a reliability decision unit which decides a legality of a transmission source of the display request, and which makes an output request for information capable of confirming a reliability of the display data that the data display unit causes the display device to output, on the basis of a result of the decision, and an output unit which outputs the information capable of confirming the reliability of the display data as complies with the output request from the reliability decision unit, separately from the display data that is caused to be outputted by the data display unit.

7 Claims, 16 Drawing Sheets

OTHER PUBLICATIONS

Yu Inamura, "Trusted Mobile Platform Technology for Secure Terminals" NTT DoCoMo Technical Journal, The Telecommunications Association, vol. 13, No. 2, pp. 25-27, Jul. 1, 2005.

English translation of Japanese Office Action issued in corresponding Japanese Application No. 2007-055966 on Dec. 20, 2011.

* cited by examiner

FIG. 4

- POLICY 1: IN EXISTENCE OF MESSAGE FROM TRUSTED OS:
  - NUMBER IS DISPLAYED ON STATUS DISPLAY WITHOUT BEING CHANGED.
  - NUMBER IS CHANGED ON STATUS DISPLAY EVERY FIXED TIME PERIOD, FOR EXAMPLE, EVERY 5 SECONDS AS (492→99A→D23).
  - TRUSTED LAMP OF KEYBOARD IS LIT UP.
  - ICON IS DISPLAYED ON STATUS DISPLAY [  ].
  - POLICY 1-1
    - CORRESPONDING NUMBER IS ALWAYS DISPLAYED ON DISPLAY.
    - ONLY WHEN SPECIFIED KEY OF KEYBOARD HAS BEEN DEPRESSED, CORRESPONDING NUMBER IS DISPLAYED ON DISPLAY FOR FIXED TIME PERIOD.

- POLICY 2: IN NONEXISTENCE OF MESSAGE FROM TRUSTED OS:
  - NOTHING IS DISPLAYED ON STATUS DISPLAY.
  - "UN-TRUST" IS DISPLAYED ON STATUS DISPLAY.
  - TRUSTED LAMP OF KEYBOARD IS PUT OUT.
  - ICON IS DISPLAYED ON STATUS DISPLAY [  ].

- POLICY 3: IN EXISTENCE OF REQUEST FROM WEB BROWSER:
  - IN CASE OF NON-SSL SITE:
    - LED OF KEYBOARD IS FLICKERED.
    - LED COLOR OF KEYBOARD IS TURNED {BLACK, RED, BLUE, ...}.
  - IN CASE OF SSL SITE:
    - LED OF KEYBOARD IS PUT OUT.
    - LED COLOR OF KEYBOARD IS TURNED {BLACK, RED, BLUE, ...}.

FIG. 9
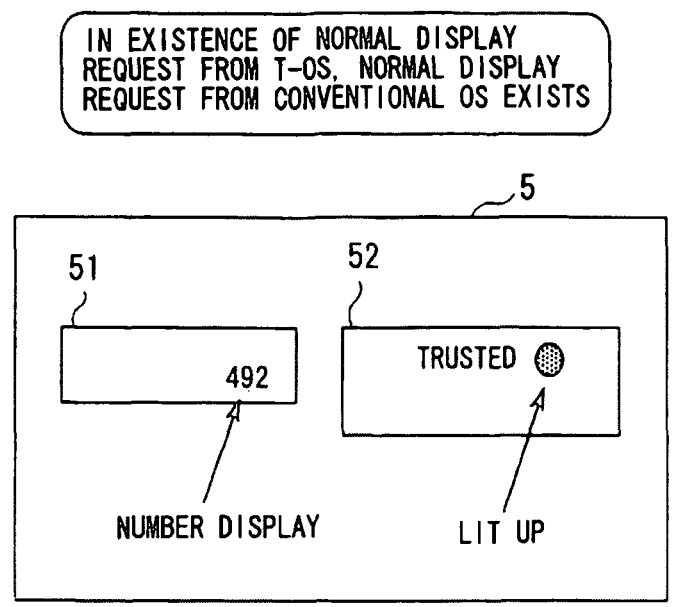
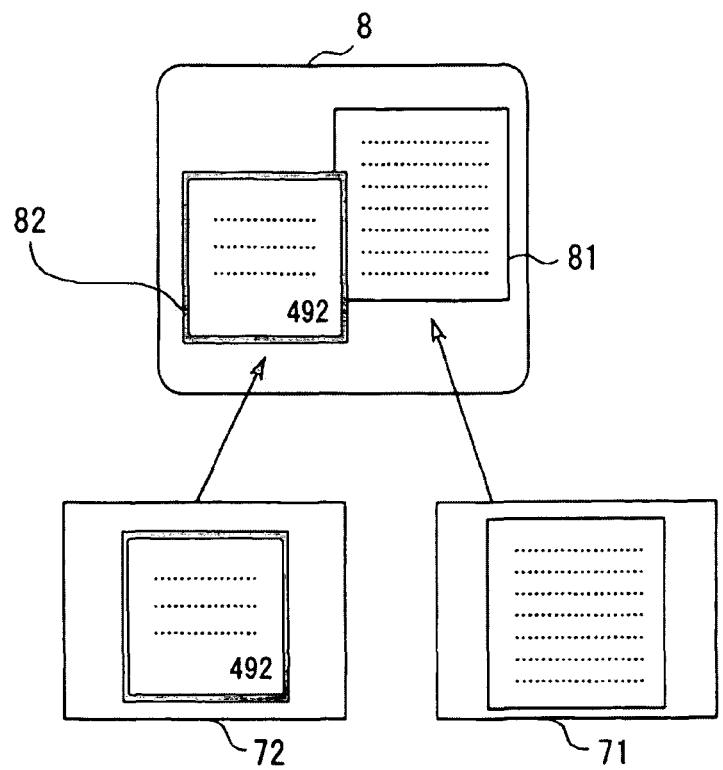

FIG. 10
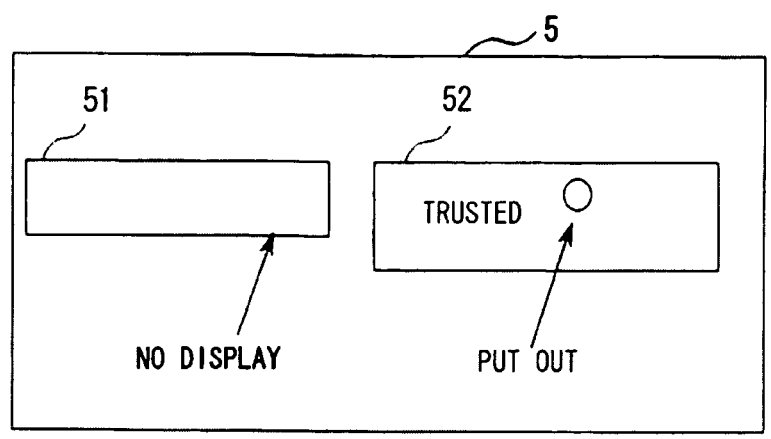
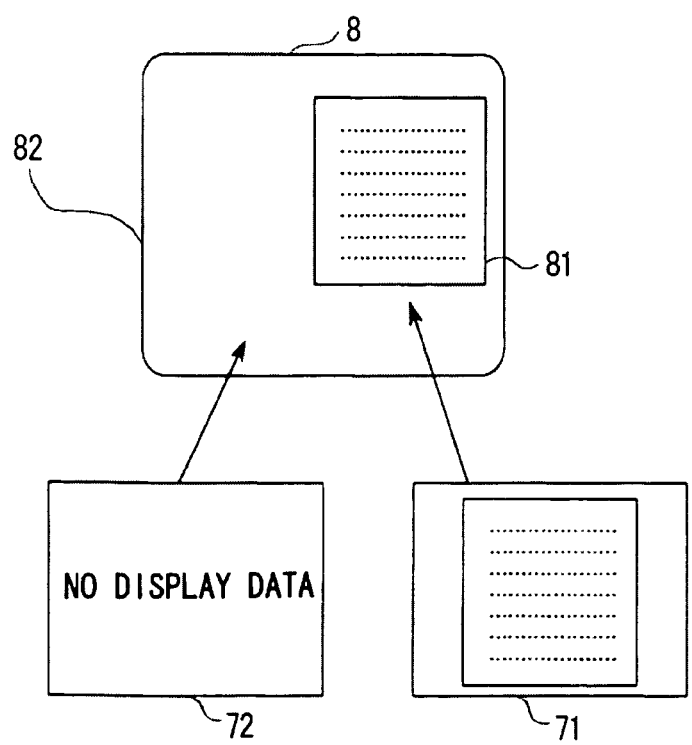

STATUS DISPLAY CONTROL APPARATUS

CROSS-REFERENCE TO RELATED APPLICATIONS

This application is based upon and claims the benefit of priority from the prior Japanese Patent Application No. 2007-55966 filed on Mar. 6, 2007, the entire contents of which are incorporated herein by reference.

TECHNICAL FIELD

This invention relates to a status display control apparatus, and more particularly to a status display (reliable display) control apparatus furnished with a security function according to which, in such a case where malicious software has been installed in a personal computer (PC) or the like computer, the existence of an illegal access is detected, and warning, reliability information or the like is given to a user.

BACKGROUND OF THE INVENTION

Nowadays, in a personal computer or the like computer, a large number of application programs are activated to incarnate various functions, under the management of an operating system (called "OS").

Malicious software elements intended to perform illegal accesses or to steal private information, etc., such as viruses and spyware, exist among the application programs, and various countermeasures are taken in order to prevent the illegal accesses, etc. by the software elements.

There has been proposed, for example, a security system wherein a hardware LSI called "TPM (Trusted Platform Module)" is undestroyably packaged in a personal computer (herein below, abbreviated to "PC"), thereby to detect the existence of illegal software and to prevent any illegal authentication (refer to Patent Document 1 being JP-A-2003-271254).

There has also been proposed a system wherein a plurality of OSes are installed on one PC, thereby to detect any illegal access and to enhance security.

By way of example, two OSes are installed, and application programs installed at will by a user are operated as in a conventional manner under the management of one of the OSes, while only software elements trusted by an IT manager or the like are operated under the management of the other OS.

Here, the "trusted software" signifies a group of software elements intended for special uses, for example, an anti-virus software element and a personal firewall. One of the two OSes shall be called the "conventional OS", and the other OS the "Trusted OS (abbreviated to "T-OS")".

The group of software elements operated under the management of the T-OS can have the screens of their processed contents displayed on the area of a special display frame displayed on a display device. More specifically, the contents which are displayed by the group of software elements operated under the management of the T-OS are generally written into a specific display memory area TFB (Trusted Frame Buffer). Information written into the TFB is displayed within the special display frame (frame for the T-OS).

FIG. 15 shows an explanatory diagram of the schematic configuration of a related art security system.

The figure shows part of the configuration of one PC, which includes a CPU, a display and a graphic chip as hardware elements.

The CPU executes management software called a "VMM (Virtual Machine Monitor)", and it operates a conventional OS and a T-OS (Trusted OS).

Besides, the graphic chip is an LSI which controls display contents for the display, and in which two display memory areas (TFB and UTFB) are included.

The TFB (Trusted Frame Buffer) is a memory area which is used only by the T-OS, while the UTFB (Un-trusted Frame Buffer) is a memory area which is used only by the conventional OS.

The display is an ordinary display device such as CRT or LCD, and it displays a display frame for the conventional OS and the display frame for the T-OS. In a case where display requests have been made by software elements operated under the managements of the respective OSes, data requested to be displayed are displayed within the display frames for the corresponding OSes.

The management software VMM chiefly includes a virtual graphic 1 which accepts a display request input from the conventional OS, a virtual graphic 2 which accepts a display request input from the T-OS, and a driver (graphic chip driver) which controls the graphic chip.

In a case, for example, where any display request has been made by the software operated under the management of the conventional OS, the virtual graphic 1 accepts the display request input, and the graphic chip driver interprets the display request and sends this display request to the graphic chip together with display data.

Upon accepting the display request, the graphic chip writes the received display data into the UTFB in a case where the display request has been made by the conventional OS. When the display data has been written into the UTFB, it is displayed within the display frame for the conventional OS.

Likewise, the display frame for the T-OS is displayed on the display, and in a case where the display request from the software operated under the management of the T-OS has been made, display data requested to be displayed is displayed within the display frame for the T-OS.

The two display frames are displayed on the display. A user is let know which of the display frames the display data is displayed in, by making the colors of the display frames different by way of example.

Assuming that the software operated under the management of the T-OS is trusted legal software at all times, contents displayed in the display frame for the T-OS on the display are not based on illegal software. Accordingly, the user considers the displayed contents as reliable information, and he/she reads the displayed contents and inputs necessary data.

However, if the color, display position, etc. of the display frame for the T-OS as is displayed on the display are fixed, an illegal display might be presented by imitating the display contents of the display frame for the T-OS. By way of example, illegal software operated under the management of the conventional OS is installed in the PC, and the same frame as the display frame for the T-OS is displayed on the display by the illegal software. In this way, the user can be deceived and think that a display of information displayed within the illegal frame was displayed by the software trusted by the T-OS.

FIG. 16 shows an explanatory diagram of such a status where the illegal display is presented by the illegal software. In this case, the illegal software is under the management of the conventional OS, and hence, all display data items requested to be displayed are written into the UTFB.

However, both the display frame for the conventional OS and the display frame for the T-OS can be displayed on the UTFB by the illegal software, and the user who is watching the display cannot discern whether or not the display frame for the T-OS is displayed by the illegal software. Therefore, the user watching the display believes that the display contents of the display will be the same as those displayed in FIG. 15.

On this occasion, assuming by way of example that a screen for causing the user to input an ID or a password is displayed in the frame pretended to be the display frame for the T-OS, the user might input the ID or the password without doubt.

Further, in a case where a process in which the inputted password or the like is transferred to another specified PC through a network is incorporated as the function of the illegal software, the password or the like is stolen.

Especially in a case where the normal display frame itself for the T-OS or a display content within this frame as is displayed through the original TFB is not displayed, the display frame for the T-OS or the display content thereof as displayed by the illegal software may possibly be judged as being reliable by the user. Accordingly, it is sometimes difficult to arrest the user's input of the password or the like.

The illegal software can intrude into the PC by various methods, and it is sometimes existent (i.e., present) in a way which is difficult to be noticed by the user. It is therefore dangerous because the user could input the password or the like while trusting only the displayed content of the display. Moreover, even when an anti-virus software element or the like is installed, it is difficult to perfectly prevent the invasion of the illegal software, and there remains the possibility that the illegal display will be presented on the display.

It is therefore desired to provide to the user, a scheme in which, although the content displayed in the display frame for the T-OS on the display is tentatively processed as being reliable, if the displayed content is really reliable can be confirmed.

This invention has been made in consideration of the above circumstances, and it has for its object to provide a status display control apparatus including output means capable of confirming the nonexistence (i.e., absence) of any illegal software, the reliability of a displayed content, etc. separately from the original displayed content on a display.

SUMMARY

According to an aspect of an embodiment, an apparatus comprises:

basic function management units each of which executes a process and then outputs a display request for displaying a result of the execution;

a data display unit which causes a display device to output display data that indicates a drawing screen complying with the display request;

a reliability decision unit which decides a legality of a transmission source of the display request, and which makes an output request for information capable of confirming a reliability of the display data that the data display unit causes the display device to output, on the basis of a result of the decision; and an output unit which outputs the information capable of confirming the reliability of the display data as complies with the output request from the reliability decision unit, separately from the display data that is caused to be outputted by the data display unit.

With the apparatus, a user can exactly judge the legality of a status displayed on the data display unit, by confirming the information outputted from the output unit. Accordingly, the user can be prevented from inputting data to, for example, a screen displayed by illegal software, and the reliability of the confirmation of the display status displayed on the data display unit can be enhanced.

Here, the "reliability judgment information" signifies information with which the user judges the reliability of the data displayed on the data display unit. In a case where the information is visual information, it is displayed on a status display portion and a keyboard display portion in FIG. 2.

In accordance with this invention, the output unit which outputs the reliability judgment information is disposed separately from the data display unit which displays the display data requested to be displayed. Therefore, the user can exactly judge the legality of the status displayed on the data display unit, by confirming the information outputted from the output unit, and he/she can prevent data from being inputted to any illegal display screen, with the result that the reliability of a display content which is displayed on the data display unit can be enhanced.

BRIEF DESCRIPTION OF THE DRAWINGS

FIG. 4 is an explanatory diagram of one embodiment of the policy contents of an agent of this invention;

FIG. 9 is an explanatory diagram of a display example 1 of a status display of this invention;

FIG. 10 is an explanatory diagram of a display example 2 of the status display of this invention;

DETAILED DESCRIPTION OF THE EMBODIMENTS

A status display control apparatus according to an embodiment of this invention includes:

basic function management units each of which executes a process and then outputs a display request for displaying a result of the execution;

a data display unit which causes a display device to output display data that indicates a drawing screen complying with the display request;

a reliability decision unit which decides a legality of a transmission source of the display request, and which makes an output request for information capable of confirming a reliability of the display data that the data display unit causes the display device to output, on the basis of a result of the decision; and an output unit which outputs the information capable of confirming the reliability of the display data as complies with the output request from the reliability decision unit, separately from the display data that is caused to be outputted by the data display unit.

In each of the basic function management units, a reliabilized operating system controls the operations of only functional modules whose reliabilities have been confirmed beforehand.

The status display control apparatus according to this embodiment includes the plurality of basic function management units. The first basic function management unit corresponds to a second OS in FIG. 1, that is, it corresponds to a trusted OS which manages the operations of functional module software elements whose reliabilities have been confirmed. Here, the "functional module" signifies an application program created for incarnating a specified function. On the other hand, the second basic function management unit corresponds to a first OS in FIG. 1, that is, it corresponds to an operating system (conventional OS) which is installed in personal computers or the like having heretofore been, and being presently, commercially available.

Besides, in this embodiment, the data display unit simultaneously displays a first display frame which displays display data requested to be displayed by the functional module operated under the management of the first basic function management unit, and the display management module, and a second display frame which displays display data requested to be displayed by the functional module operated under the management of the second basic function management unit.

Figure 1:
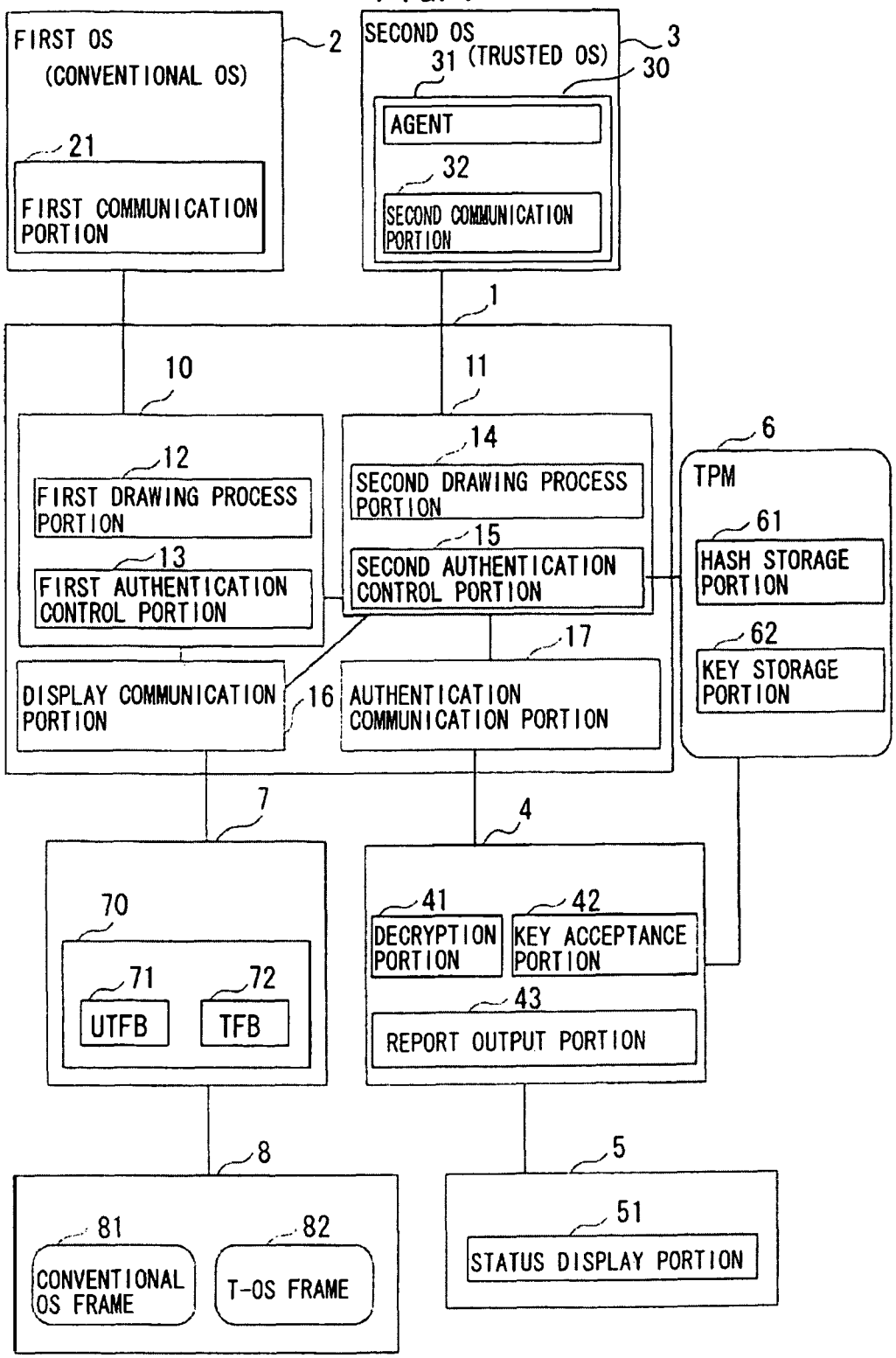
FIG. 1 is a configurational block diagram of a status display control apparatus of this invention.

In this embodiment, the data display unit corresponds to a display device in FIG. 1, and it is a display which displays display data to be displayed by the activated specified functional module. Here, the "first display frame" signifies a T-OS frame in FIG. 1, while the "second display frame" signifies a conventional OS frame in FIG. 1. A display device used generally, such as a CRT, an LCD, an organic EL or PDP, can be employed as the data display unit.

Besides, the output unit includes a status display portion with which the display status of the display data displayed on the data display unit can be visually confirmed.

The output unit offers a variety of information to the user, and the output method thereof is not restricted. It is possible to employ, for example, a display device with which the information can be visually confirmed. The status display portion is one output unit with which the information can be visually confirmed.

The CRT, the LCD or the like as mentioned above can also be employed as the status display portion, but LEDs or dedicated display elements capable of displaying a specified character, numeral, pattern or icon may well be employed.

Further, a vocal output device (loudspeaker) with which information can be aurally confirmed, a printer which can output information as a document, or the like may well be employed as the output unit.

Besides, the status display control apparatus according to this embodiment includes a status display portion which presents a specified status display indicating that the display data displayed within the first display frame is display data requested from the functional module operated under the management of the first basic function management unit.

Here, the status display portion signifies a display device which does not display the display data itself requested from the functional module, but with which the display status of the data displayed on the data display unit is confirmed. In addition, the status display portion especially presents a display for confirming the specified status of the display data displayed within the first display frame (T-OS frame) that is displayed on the data display unit.

Here, the specified status is a status which indicates that the display data displayed within the first display frame (T-OS frame) is data requested to be displayed by the functional module operated under the management of the first process execution unit (for example, the trusted OS). Upon viewing the specified status display, the user can confirm whether or not the display status of the first display frame is reliable.

Incidentally, the "specified status display" signifies a display which is presented on a status display portion 51 and a keyboard display portion 52 to be explained later.

Besides, the status display control apparatus according to this embodiment includes a reliability information management unit in which judgment information serving as criteria for deciding the legality of the transmission source of the display request is stored beforehand. The reliability information management unit includes a tamper-resistant storage device (Trusted Platform Module: TPM). Hash values for specifying the individual functional modules, the basic function management units, the display management module and the reliability decision unit, respectively, are stored in the TPM. Here, the "hash values" signify hash values which are stored in the hash storage portion of the TPM to be explained later.

Besides, the reliability decision unit according to this embodiment includes a storage portion in which authentication data for specifying the display management module is stored beforehand, and an authentication portion which authenticates the reliability of the transmission source of the display request. In a case where the hash value of the display management module stored in the TPM and the authentication data have agreed, the authentication portion judges the display management module as being legal. The reliability decision unit corresponds to a reliability decision unit (VMM) in FIG. 1.

Further, the TPM according to this embodiment includes a key storage portion in which a key for encrypting the display request is stored. The reliability decision unit according to this embodiment further includes an encryption portion which encrypts information contained in the display request, and a key exchange portion which acquires the key for the encryption process of the encryption portion, from the TPM.

Here, the key for the encryption corresponds to a common key "KEY" to be explained later.

Besides, upon accepting the display request from the display management module, the reliability decision unit according to this embodiment presents the specified status display on the status display portion.

This is relevant to a display example 1 in FIG. 9 to be explained later.

Further, the reliability decision unit according to this embodiment does not present the specified status display on the status display portion in a case where the display request from the second basic function management unit has been accepted, and where the display request from the display management module under the management of the first basic function management unit is not accepted.

This is relevant to a display example 2 in FIG. 10 to be explained later.

Now, this invention will be described in detail in conjunction with embodiments shown in the drawings. Incidentally, this invention shall not be restricted to the embodiments.

<Configuration of Status Display Control Apparatus>

FIG. 1 shows a schematic configurational block diagram of one embodiment of the display status control apparatus of this invention.

The status display control apparatus in FIG. 1 is provided in a state where it is incorporated in an information processor, for example, a personal computer.

Individual functional blocks shown in FIG. 1 are the functions of the information processor, and only major functions concerning the embodiments of this invention are shown. Besides, the individual functional blocks are configured by hardware or software, but among them, OSes (2 and 3) and a reliability decision unit 1 should preferably be configured by the software.

The two OSes (basic function management units) are installed in the information processor according to this embodiment.

The first OS (2) is a conventional OS which manages the operations of application programs installed by a user, while the second OS (3) is a trusted OS (T-OS) which manages the operations of a group of legal software elements whose reliabilities have been confirmed.

The "group of software elements" signify software elements as to which only a specified manager in charge or an OS vendor can perform additions, revisions and deletions, and whose reliabilities have been verified by the OS vendor or the like. Besides, a group of software elements constituting the T-OS itself are software elements whose reliabilities have been verified by the OS vendor or the like.

The first OS (2) includes a first communication portion 21 which communicates with the reliability decision unit 1. In this invention, the first communication portion 21 has the function of transmitting information to be displayed on a display device 8, to the reliability decision unit 1 upon receiving a display instruction from the application program.

The second OS (3) includes a display management section 30 which manages and controls a status display peculiar to this invention. The display management section 30 has the function of transmitting information to be displayed on the display device 8 and an output unit 5, to the reliability decision unit 1 upon receiving a display instruction from the application program which is operated under the management of the second OS.

The display management section 30 chiefly includes an agent 31 and a second communication portion 32. The agent 31 is a portion which chiefly monitors the display request, and which display-controls the status information to be displayed on the output unit 5.

The second communication portion 32 is a portion which transmits the information to be displayed, to the reliability decision unit 1 likewise to the first communication portion 21, but it is a portion which gives the information to be displayed on the output unit 5, to the reliability decision unit 1 under a command from the agent 31.

The first communication portion 21 corresponds to a graphic driver 1 (22) and a KBC driver 1 (21) in FIG. 2 to be explained later. The second communication portion 32 corresponds to a graphic driver 2 (33) and a KBC driver 2 (34) to be explained later.

The reliability decision unit 1 (VMM: Virtual Machine Monitor) is constituted by a group of software elements which are directly controlled by a CPU, and it is a portion which controls the communications between the two OSes and the display device or the like external input/output equipment. Accordingly, the VMM 1 is logically located between the two OSes and the CPU.

The reliability decision unit 1 (VMM) is chiefly configured of display input sections (10 and 11), a display communication portion 16 and an authentication communication portion 17.

The display input sections consist chiefly of the first display input section 10 which receives information from the first OS (2), and the second display input section 11 which receives information from the second OS (3).

The display communication portion 16 is a portion which gives contents to-be-displayed to a display controller 7, and it corresponds to a display driver (graphic chip driver) to be explained later.

The display communication portion 16 receives display data from the first display input section 10 and display data from the second display input section 11, and it gives the received display data to the display controller 7.

The authentication communication portion 17 chiefly transmits to a report control unit 4, a judged result as to whether or not the display request sent from the first OS (2) or the second OS (3) is legal, and display information for reporting the result. Besides, the authentication communication portion 17 initializes the report control unit (KBC chip) 4. Further, the authentication communication portion 17 transmits information for controlling the operation of the report control unit (KBC chip) 4. This authentication communication portion 17 corresponds to an authentication driver to be explained later.

The control of the report control unit 4 can be performed only by the authentication communication portion 17.

Both the first and second display input sections (10 and 11) include drawing process portions (12 and 14), and authentication control portions (13 and 15).

The first and second drawing process portions (12 and 14) are portions which accept display data transmitted from the corresponding host OSes and then sends the display data to the display communication portion 16. The display data handled by the drawing process portions (12 and 14) are displayed on the display device 8.

The first drawing process portion 12 corresponds to a virtual graphic 1 to be explained later, while the second drawing process portion 14 corresponds to a virtual graphic 2 to be explained later.

The first and second authentication control portions (13 and 15) are portions which chiefly generate information items to be outputted to the report control unit 4, upon receiving display instructions requested from the OSes.

The first authentication control portion 13 corresponds to a virtual KBC 1 to be explained later, while the second authentication control portion 15 corresponds to a virtual KBC 2 to be explained later.

The second authentication control portion 15 is also a portion which receives information items on a display request from the second communication portion 32 and a display request from the first authentication control portion 13, which judges whether or not the display requests are legal, and which transmits the results of the judgments to the authentication communication portion 17.

The detailed configuration and operation of the second authentication control portion 15 will be described later.

The display controller 7 is a portion which expands the display data sent from the display communication portion 16, in a display memory area 70, and which performs the control of causing the display device 8 to display the display data. This display controller 7 corresponds to a graphic chip to be explained later.

Here, in this invention, the display memory area 70 is provided with an area UTFB (Un-trusted Frame Buffer) 71 for the conventional OS, and an area TFB (Trusted Frame Buffer) 72 for the T-OS.

The display device 8 is a display element such as CRT or LCD, and the display data stored in the display memory area 70 are displayed on corresponding portions on the display device 8.

In this invention, a conventional OS frame 81 and a trusted OS (T-OS) frame 82 are displayed within the display screen of the display device 8. In addition, the data stored in the area of the UTFB 71 is displayed within the conventional OS frame 81, while the data stored in the area of the TFB 72 is displayed within the T-OS frame 82.

In a case where a legal software element operated under the management of the conventional OS has made a display request, display data requested to be displayed is displayed within the conventional OS frame 81.

On the other hand, in a case where a reliable legal software element operated under the management of the T-OS has made a display request, data requested to be displayed is displayed within the T-OS frame 82.

The display control and display content for the display device 8 are the same as in the related art.

The report control unit 4 is a portion which receives information (report instruction command) transmitted from the authentication communication portion 17, and which gives the output unit 5 a report output corresponding to the information.

This report control unit 4 corresponds to a KBC chip to be explained later.

Besides, the report control unit 4 is chiefly configured of a decryption portion 41, a key acceptance portion 42 and a report output portion 43.

The key acceptance portion 42 is a portion which acquires a key "KEY" stored in a TPM 6, from this TPM 6.

The decryption portion 41 is a portion which restores the information transmitted from the authentication communication portion 17, by using the key "KEY" that the key acceptance portion 42 has acquired.

The report output portion 43 is a portion which interprets information restored by the decryption portion 41, and which generates information to be outputted to the output unit 5, so as to control the operation of the output unit 5.

The output unit 5 is a portion which reports information indicating the status of the current display content of the display device 8, to the user on the basis of an instruction from the report output portion 43. Besides, the output unit 5 is configured so as to be controlled only by the report control unit 4, and so as not to be directly controllable from either of the two OSes.

The report includes, for example, a visual report such as a character, a numeral, a pattern, the lighting-up and putting-out or the flickering of an LED, or the change of the display color of the LED, or an aural report such as vocal warning. Any of other various aspects is considered as the report.

The report based on the display of the character and the lighting-up and putting-out of the LED as the visual report will be described below.

By way of example, the operating status of the software operated under the management of the T-OS (for example, a numerical display), and a status which indicates whether or not a content currently displayed within the T-OS frame 82 of the display device 8 is displayed by the reliable software operated under the decision of a T-OS regarding reliability is displayed on the output unit 5 in a visually recognizable manner.

The status display portion 51 of the output unit 5 is a portion which visually reports the operating status as stated above, to the user by using the character or the numeral. In a case, for example, where a display request exists from the software operated under the management of the T-OS 3, to the display device 8, the display of a specified icon or character, the display of a No. signifying the existence of the display request of the T-OS, or the like is presented on the status display portion 51.

In the existence of such a display, it is meant that the content displayed within the T-OS frame 82 of the display device 8 has been displayed by the reliable software operated under the T-OS reliability decision.

On the other hand, the absence of the display means that anything which ought to be displayed by the reliable software operated under the T-OS reliability decision does not exist within the T-OS frame 82, or that a display request has not been made by reliable software.

The status which is displayed on the status display portion 51 is a status which has been given via the second authentication control portion 15, TPM 6, authentication communication portion 17 and report control unit 4 on the basis of an instruction input (display request) from the agent 31 shown in FIG. 1. That is, irrespective of whether or not illegal software intervenes, the status can be relied on by the user, owing to the operations of these functional blocks as will be explained later.

Accordingly, the user can determine without anxiety, for example, whether or not he/she can input a password to a password input screen displayed within the T-OS frame 82 of the display device 8, by confirming the status display presented on the status display portion 51.

By way of example, in a case where the status display (No. display) signifying a safe situation is presented on the status display portion 51, the user inputs an ID or the password by relying on the displayed content when the screen display prompts him/her to input the ID or the like to the T-OS frame 82 of the display device 8.

On the other hand, it is assumed that a screen display prompting the user to give any such input is presented within the T-OS frame 82 of the display device 8 in a case where the status display signifying safe conditions is not presented on the status display portion 51 (in the case of no status display). Then, the user can judge that the current "screen display prompting the user to give the input" might be a false display, by confirming the nonexistence of any status display on the status display portion 51. That is, the user can be prevented from inputting the ID or the like in response to the false display.

The TPM 6 is a security device having heretofore been utilized, and it includes a hash storage portion 61 and a key storage portion 62 therein, together with the CPU.

The hash storage portion 61 is a memory which retains hash values that are transmitted from a predetermined group of management software elements (a BIOS, a loader, the VMM, etc.) activated in succession upon the start of the power source of the PC.

In a case, for example, where the software elements are activated in the sequence of the BIOS, loader, VMM, agent and T-OS, the BIOS measures the code of its own and saves the resulting hash value in the hash storage portion 61. The BIOS then measures the loader and saves the resulting hash value, the loader measures the VMM and saves the resulting hash value, the VMM measures the agent and saves the resulting hash value, and the agent measures the T-OS and saves the resulting hash value.

The key storage portion 62 is a memory in which the common key "KEY" of this invention for use in the second authentication control portion 15 and the decryption portion 41 of the report control unit 4 is saved beforehand.

By way of example, the key "KEY" is generated by the second authentication control portion 15 at the activation of the VMM 1 and is transmitted to the key storage portion 62 of the TPM 6 so as to be saved beforehand.

Alternatively, the report control unit 4 can generate the common key "KEY" at its activation, and the key "KEY" can be transmitted to the TPM 6 through the key acceptance portion 42 so as to be stored in the key storage portion 62 of the TPM 6.

Figure 2:
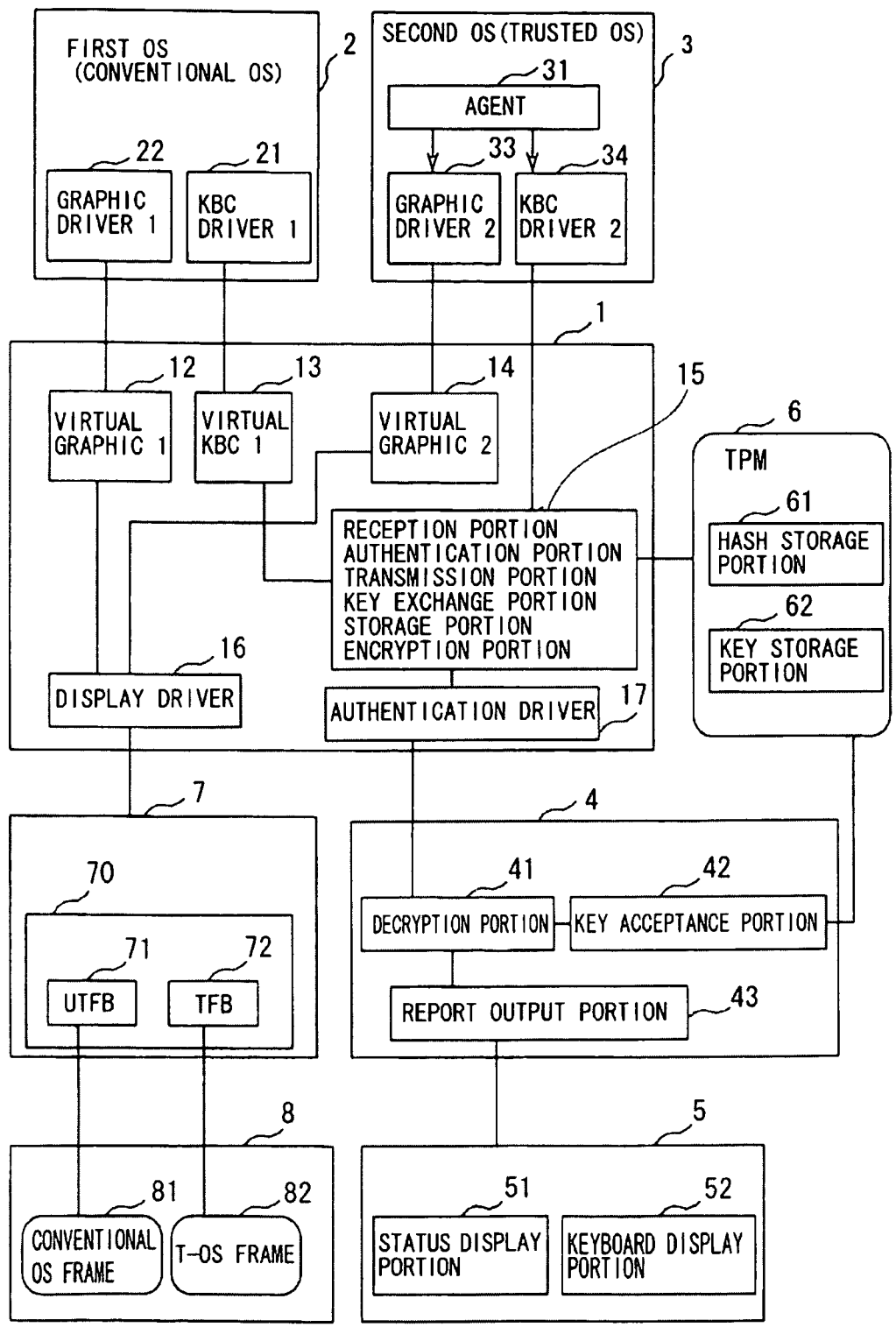
FIG. 2 is a configurational block diagram of one embodiment of the status display control apparatus of this invention.

FIG. 2 shows a configurational block diagram of one embodiment of the status display control apparatus of this invention.

Functional blocks in FIG. 2, to which the same blocks as shown in FIG. 1 are assigned, shall have the same functions.

Referring to FIG. 2, in a case where a display request has been made by legal software operated under the management of a first OS (conventional OS) 2, display data contained in the display request is sent from a graphic driver 1 (22) to the virtual graphic 1 (12) of a VMM 1. Further, the display data contained in the display request is sent from the virtual graphic 1 (12) of the VMM 1 to a display driver 16 and is converted into displayable information, which is given to a graphic chip 7.

In the graphic chip 7, the displayable information is expanded in the UTFB 71 of a display memory area 70, so as to be displayed within the conventional OS frame 81 of a display device 8.

In a case where a display request has been made by normal software operated under the management of a second OS (T-OS) 3, display data contained in the display request is sent from a graphic driver 2 (33) to the virtual graphic 2 (14) of the VMM 1 and is further sent to the display driver 16.

In addition, the display data is converted into displayable information, which is given to the graphic chip 7 and is expanded in the memory area of the TFB 72 of the display memory area 70, so as to be displayed within the T-OS frame 82 of the display device 8.

Besides, when the display request is sent from either OS to the VMM 1, control signals (a select signal, identification information, a hash value, etc.) coexisting with the display request are sent from the KBC driver (21 or 34) of the corresponding OS (2 or 3) to a corresponding virtual KBC (13 or 15).

The KBC driver (21 or 34) has the function of initializing the virtual KBC (13 or 15) of the VMM 1, and the function of controlling the operation of the virtual KBC (13 or 15).

The virtual KBC 2 (15) performs the authentication, etc. of an agent 31 on the basis of the control signals from the KBC driver 2 (34), thereby to judge whether or not the display request is legal, and it transmits information based on the judgment, to a KBC chip 4 corresponding to the report control unit 4.

This virtual KBC 2 (15) chiefly includes a reception portion, a transmission portion, a storage portion, an authentication portion, a key exchange portion and an encryption portion. These portions will be explained later.

Referring to FIG. 2, the KBC chip 4 has the function of generating information for making a report to an output unit 5. It also has the functions of monitoring and controlling external input/output equipment as are the original functions of the KBC chip 4.

Such functions embrace, for example, the function of interpreting key information inputted from a keyboard, generating the input code of a depressed key and transmitting the generated code to the OS (2 or 3) through the KBC driver (21 or 34), the function of lighting up or putting out an LED accessory to the keyboard, on the basis of an instruction from the OS, the function of transferring input information from pointing input equipment such as a mouse, to the OS, the function of charging a battery, and the function of monitoring the battery.

The output unit 5 may well include a dedicated status display portion 51 as a display element for presenting a status display, and also a keyboard display portion 52 made of the LED originally included in the keyboard, or the like (hereinbelow, the display portions shall be also called the "status displays").

Besides, the keyboard display portion 52 may well be provided with a dedicated LED (also called "trusted lamp") which indicates that the display request from the T-OS has been currently made.

Besides, the agent 31 is a resident software element which exists only in the T-OS 3, and which serves to control the status display for the output unit 5.

The chief functions of the agent 31 embrace the function of receiving the display request from the software operated under the management of the T-OS and then monitoring whether or not the display request is legal, the function of transmitting the display request to the virtual graphic 2 (14) through the graphic driver 2 (33), when the display request is legal, the function of generating identification information which corresponds to the content of the display request, and the function of transmitting the generated identification information to the virtual KBC 2 (15) through the KBC driver 2 (34).

The identification information which the agent 31 generates is information which is generated on the basis of agent policies as shown in FIG. 4.

The identification information items are, for example, information J1 indicating that the display request is legal, and information J2 indicating that the display request might be illegal.

The "agent policies" signify the, list of report contents describing which of the report information items is to be displayed on the output unit 5. The agent policies are set by an IT manager, and are stored in the T-OS beforehand.

In FIG. 4, three policies are indicated as one embodiment. The policy 1, for example, indicates a case where a display request exists from the software under the management of the T-OS, and where any message is displayed within the T-OS frame 82.

In the case of the policy 1, four sorts of variations are indicated in FIG. 4.

Any of the four sorts of variations is selected by initialization or the set input of a user. A display corresponding to the selected item is presented on the output unit 5.

Besides, it is indicated as a policy 1-1 that a No. may well be affixed to the status display at all times. As an alternative measure, it is indicated that, in order to avoid a complicated display to the utmost, the No. may well be displayed for only a fixed time period, only when the user has depressed the specified key of the keyboard.

<Configuration of Virtual KBC2>

Figure 3:
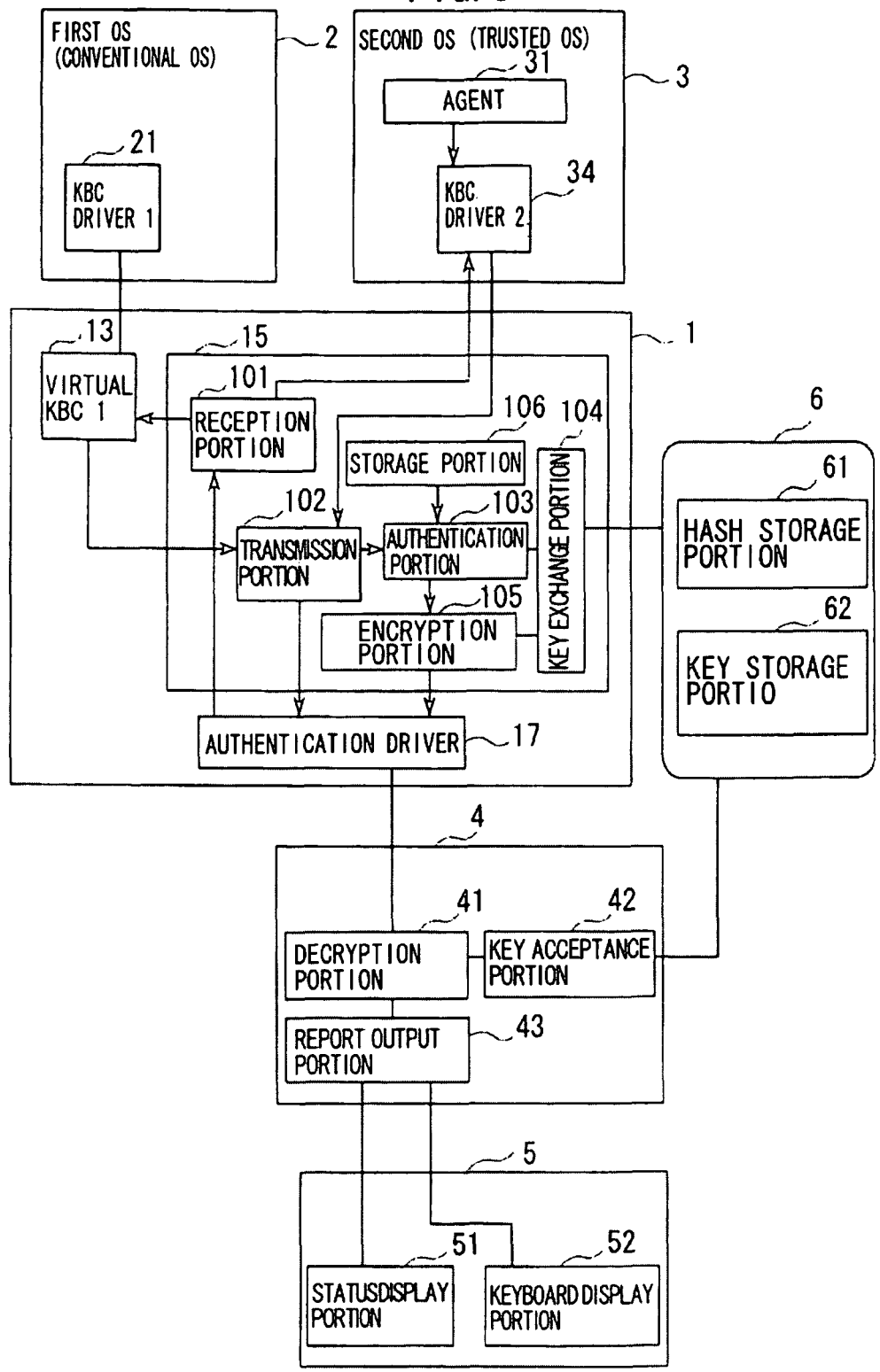
FIG. 3 is a configurational block diagram of one embodiment of a virtual KBC 2 of this invention.

FIG. 3 shows an explanatory diagram of the configuration of the virtual KBC 2 (15) according to one embodiment.

Regarding functional blocks outside the virtual KBC 2, only those directly relevant to the virtual KBC 2 are shown in FIG. 3.

As stated before, the virtual KBC 2 includes the reception portion 101, transmission portion 102, authentication portion 103, key exchange portion 104, encryption portion 105 and storage portion 106.

The reception portion 101 is a portion which accepts information (for example, key input information or mouse input information) received by the authentication driver 17, and which gives the received information to the OS (2 or 3).

In this embodiment, the two OSes are existent, and hence, four cases to be stated below are considered as methods for giving the received information.

A case (case 1) where the reception portion 101 gives the received information to both the conventional OS and the T-OS, a case (case 2) where it gives the information to only the T-OS, a case (case 3) where it gives the information to only the conventional OS, and a case (case 4) where it gives all the received information items to the T-OS and where it gives only some data to the conventional OS.

Which of the four cases is adopted, may be fixedly initially set beforehand, but it may well be determined in accordance with a selection signal (not shown) sent from the KBC driver 2 (34) of the T-OS.

In the case 4, which data are given to the conventional OS as some data, may well be determined on the basis of, for example, instruction information from the KBC driver 2 (34).

In a case, for example, where the instruction information contains information which must not be given to the conventional OS among the information items received by the reception portion, the remaining received information items with the information (for example, private information) deleted are given to the conventional OS.

Transmission sources which transmit the display request to the virtual KBC 2 include a functional module (application program) which is operated under the management of the conventional OS (2), and a functional module (application program) which is operated under the management of the T-OS (3).

The transmission portion 102 receives a request command created in correspondence with the display request from the T-OS or the conventional OS, and executes a process on the basis of the request command. As the process based on the request command, in a case, for example, where the request command is simply a display request for the display device 8, this request command is directly transmitted to the authentication driver 17.

Besides, in a case where the request command contains an access to the output unit 5, the authentication portion 103 is requested to analyze the content of the request command.

As a practicable example, there is a case where the request command sent from the KBC driver 2 (34) of the T-OS is formed of an address, and data to be written into the address. When the request command is the command of access to a specified area whose address range is, for example, 0x0000 to 0x1000, the authentication portion 103 is requested to authenticate software which has transmitted the request command.

Besides, when the command sent from the KBC driver 1 (21) of the conventional OS through the virtual KBC 1 (13) is the request command for a specified area to access the output unit 5, the transmission portion 102 does not accept the request command and does not make any request for the authentication portion 103, either. That is, the transmission portion 102 cancels the request command which has been sent from the virtual KBC 1 (13), and which intends to control the output unit 5.

Thus, even if illegal software operated under the conventional OS is existent, any display on the output unit 5 can be prevented from being presented by the illegal software, and a reliable display can be presented on the output unit 5 on the basis of only software which is reliable under the T-OS reliability decision.

As shown in FIG. 3, in a case where a display request has been made by software operated under the management of the conventional OS, a request command corresponding to the display request is given to the transmission portion 102 through the KBC driver 1 (21) and the virtual KBC 1 (13).

This request command consists of, for example, display data, an address to which the data is to be outputted, and information which indicates that the command has come from the virtual KBC 1 (information which indicates that a transmission source is the virtual KBC 1). The transmission portion 102 checks the content of the command, to know that the display request has been made from the software on the conventional OS side.

Also in a case where a request command has been given from the KBC driver 2 (34) on the T-OS side, the transmission portion 102 similarly checks the content of the command, to know that the display request has been made from the software on the T-OS side.

The authentication portion 103 is a portion which authenticates whether or not the software of a transmission source having transmitted a display request is reliable (whether or not the software is legal), on the basis of a request from the transmission portion 102. Information stored in the storage portion 106 beforehand is used in the process of the authentication.

The information (hereinbelow, called "authentication data") for specifying the agent 31 which manages display requests from software elements operated under the management of the T-OS is stored in the storage portion 106 of the VMM 1 beforehand. By way of example, the IT manager records the authentication data into the storage portion 106 at the distribution of the T-OS.

Besides, in the authentication, the authentication portion 103 acquires data to be compared with the authentication data, from a TPM 6. The data to be compared is the hash value of the agent 31 measured by the TPM 6 at the startup of a PC, and it is data saved in the hash storage portion 61 of the TPM 6.

That is, in a case where the authentication portion 103 authenticates whether or not the agent 31 of the T-OS 3 is legal, it checks whether or not the authentication data stored in the storage portion 106 beforehand and the hash value of the agent 31 acquired from the TPM 6 agree.

In a case where the authentication data and the hash value disagree, it is judged that the agent 31 is not legal, the display request from the agent 31 is not accepted, and a display conforming to the agent policy is presented on the output unit 5. By way of example, there is presented a display (!!OS!!) which indicates that the agent 31 might be illegal.

In a case where the authentication data and the hash value have agreed, it is judged that the agent 31 is reliable. Therefore, the display request from the T-OS 3 is accepted, and the transmission portion 102 transmits the received request command to an authentication driver 17.

On this occasion, the received request command is not directly transmitted to the authentication driver 17, but it is transmitted after being encrypted by the encryption portion 105.

The encryption is done for the reason that the fair VMM is not always operating. If the encryption is not done, an unfair VMM might be capable of controlling the output unit 5 at will.

The encryption portion 105 is a portion which encrypts the request command obtained from the authentication portion 103, by using a key "KEY" acquired by the key exchange portion 104.

The key exchange portion 104 is a portion which acquires the key "KEY" that is stored in the key storage portion 62 of the TPM 6 beforehand. As will be explained later, the key exchange portion 104 is a portion which transmits to the TPM 6, a key "KEY" generated in a key exchange process that is executed at the activation of the software of the VMM 1 or the like.

In a case where the authentication portion 103 has succeeded in the authentication as stated above, it first causes the key exchange portion 104 to acquire the key "KEY" stored in the key storage portion 62. Subsequently, it gives the encryption portion 105 the request command given from the transmission portion 102. Then, the encryption portion 105 encrypts the request command with the acquired key "KEY". The encrypted request command is given to the authentication driver 17, and is further transmitted to the KBC chip 4.

Here, among request commands which are given from the agent 31 to the transmission portion 102, the "request command which is outputted to the output unit 5 and which indicates the access to the specified area" is data which is formed of, for example, the address (for example, 0x0000 to 0x1000) indicating the specified area, a flag indicate "write", and information such as display data to be delivered to the output unit 5.

Besides, in the KBC chip 4, when the display data (encrypted request command) transmitted from the authentication driver 17 is received, it is restored by a decryption portion 41.

On this occasion, the key "KEY" is acquired from the key storage portion 62 of the TPM 6 by a key acceptance portion 42, and the decryption portion 41 restores the display data by using the acquired key "KEY".

The restored display data contains information items, for example, an icon sort or numerical value which is displayed on the status display portion 51, and the color of the LED of the keyboard display portion 52.

A report output portion 43 generates report information (status display information) to be given to the output unit 5, from these information items, and it sends the report information to the output unit 5. By way of example, status display information for displaying the existence of a display request from the T-OS, for the status display portion 51 by an icon is generated, and it is transmitted to the status display portion 51.

The above is the description of the schematic operations of the virtual KBC 2 (15) and the functional blocks relevant thereto.

Incidentally, the authentication data stored in the storage portion 106 beforehand has been used as one data used for the comparison in the authentication process executed by the authentication portion 103, but this aspect is not restrictive.

The authentication data (hash value) to be compared may well be acquired in such a way that access destination information (URL) stored in the storage portion 106 or the like beforehand at the shipment of the PC is read out, and that an external PC indicated by the URL is accessed.

<Key Exchange Process>

Here will be described a key exchange process which is executed immediately after the system management software of the OS, the VMM 1 or the like has been activated, or when a designated event such as return from a sleep status has occurred.

The key exchange process is a process in which a common key "KEY" for use in the virtual KBC 2 (15) of the VMM 1 and the KBC chip 4 is generated, and in which the key "KEY" is saved in the key storage portion 62 of the TPM 6 so as to be shared by both the virtual KBC 2 (15) and the KBC chip 4.

Figure 5:
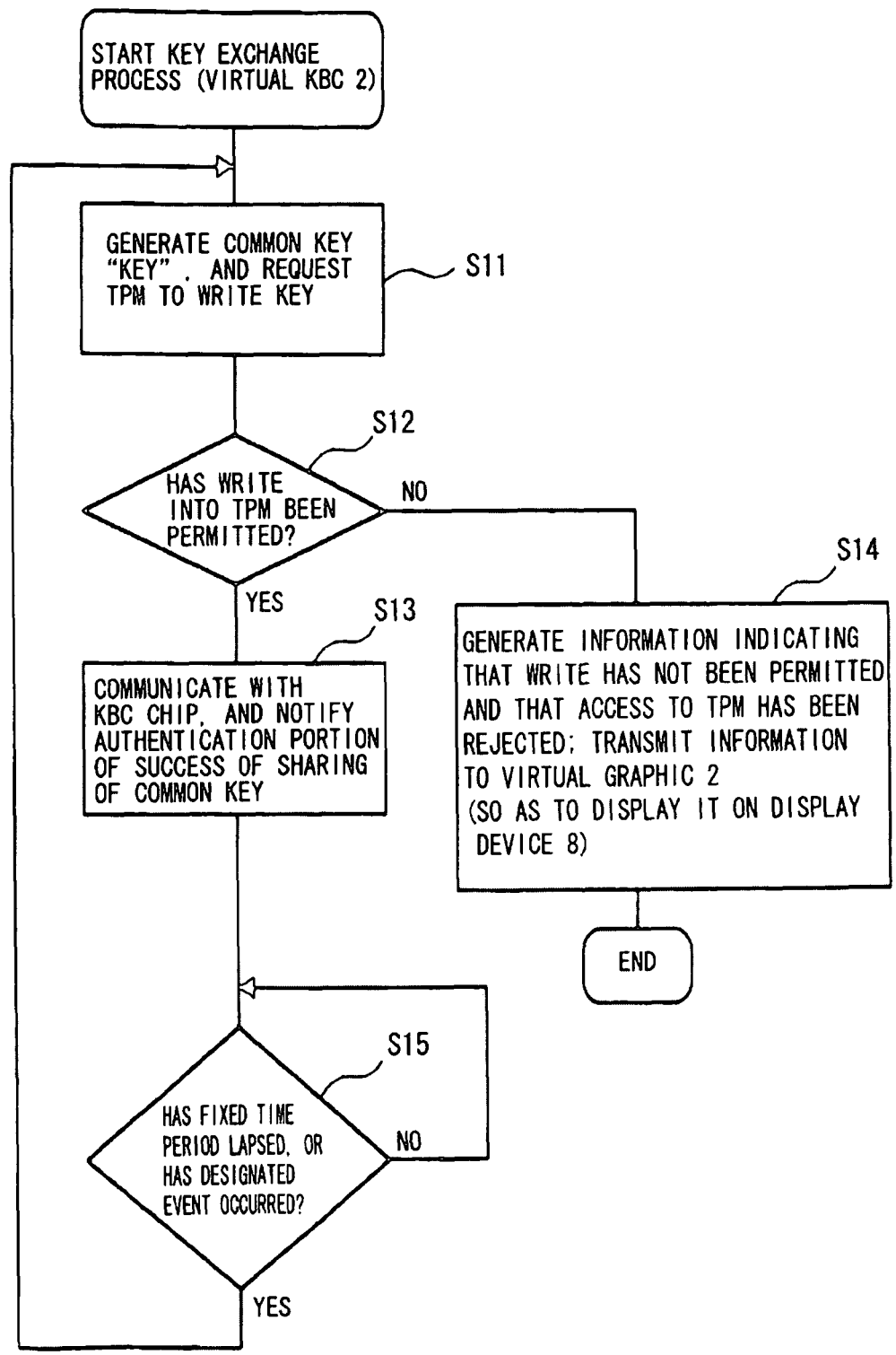
FIG. 5 is a flow chart of a key exchange process in the virtual KBC 2 of this invention.

FIG. 5 shows a flow chart of one embodiment of the key exchange process of this invention.

This process is a process which is executed by the virtual KBC 2.

First, at a step S11, the common key "KEY" is generated using a random number generated by the TPM chip 6, and an instruction for writing the common key "KEY" is transmitted to the TPM chip 6.

In a case where the TPM 6 and the virtual KBC 2 are connected by a GPIO bus, the common key "KEY" is transmitted via the GPIO bus.

The TPM 6 having received the write instruction checks whether or not the write instruction is legal. The check is done in such a way that two predetermined hash values are compared by the CPU within the TPM 6.

One hash value of the comparison is such that the hash value indicating the status of the VMM 1 has been measured before the shipment of the PC, and that the measured value has been stored in the TPM 6 beforehand. The other hash value is such that all the codes of the VMM 1 have been measured by the BIOS before the startup of this VMM 1, and that the resulting hash value has been given from the BIOS to the TPM 6.

In a case where the two hash values have agreed, the write instruction into the TPM 6 is judged to be legal, and the write of the key "KEY" is permitted. In the case where the write has been permitted, the key "KEY" is written into the key storage portion 62 of the TPM 6, and the fact of the permission is notified from the TPM 6 to the virtual KBC 2.

On the other hand, in a case where the hash values have disagreed, it is notified from the TPM 6 to the virtual KBC 2 that the write has not been permitted. In the case of the disagreement, the VMM 1 itself might be illegal software by way of example.

At a step S12, the notification from the TPM 6 is confirmed, thereby to check whether or not a write access to the TPM 6 has been permitted. When the virtual KBC 2 has recognized the permission, the key exchange process proceeds to a step S13, and when not, the process proceeds to a step S14.

At the step S13, the key exchange portion 104 communicates with the KBC chip 4 via the GPIO bus, and it notifies the authentication portion 103 that the virtual KBC 2 (15) has succeeded in the sharing of the common key "KEY".

Further, the process proceeds to a step S15, so as to check whether or not a fixed time period previously set has lapsed, or whether or not the designated event (for example, the sleep, inactive status and re-startup of the PC) has occurred.

In case of the occurrence of the designated event or the lapse of the fixed time period, the process returns to the step S11, and similar processing is repeated so as to update the common key "KEY".

In a case where the write has not been permitted at the step S12, that is, where unpermission has been notified by the TPM 6, information which indicates that the access to the TPM 6 has been rejected is generated at the step S14. In addition, information which indicates that an abnormality has existed in the key exchange may well be transmitted to the virtual graphic 2 (14), so as to display to that effect on the display device 8.

Besides, it is also allowed to present a display which prompts the user to download a normal set value from a PC vendor and to update the hash value recorded in the TPM 6 beforehand, because the hash value is not correct.

According to this aspect, the user of the PC can know the abnormality of the PC at the startup of the PC, or the like, and he/she can prevent any illegal access ascribable to the illegal VMM 1 or to illegal software existing within the VMM 1, at a stage before making an actual display request.

In the case where the sharing of the common key has been successful in the key exchange process, a report output to the output unit 5 (status display control) can be done through the KBC chip 4 thenceforth.

<Status Display Control Process of Agent>

Here will be described the operation of the agent 31 which is one of the application programs operated under the management of the T-OS.

After the activation of the T-OS 3, the agent 31 is automatically initialized and activated by the T-OS 3.

Figure 6:
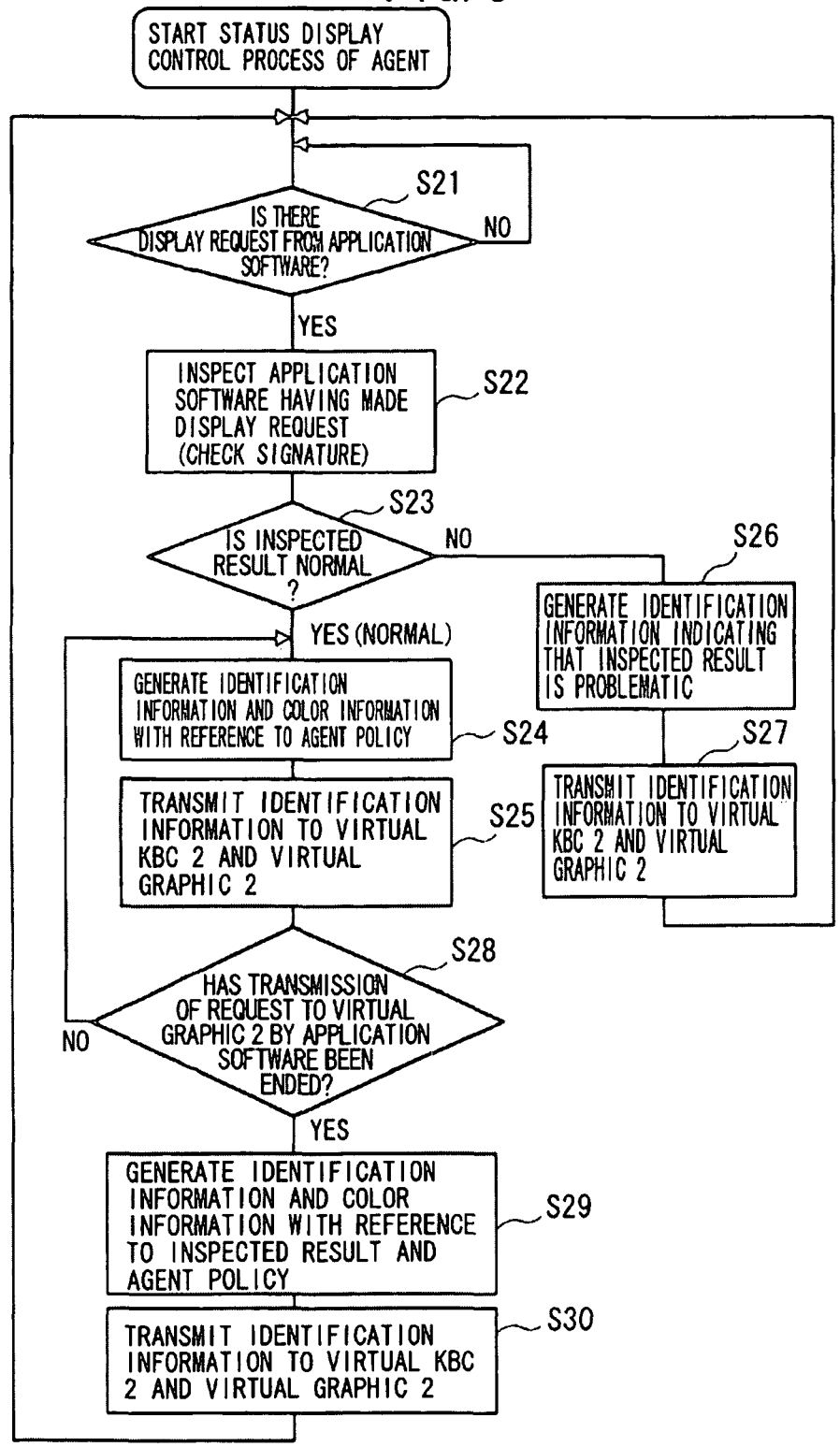
FIG. 6 is a flow chart of a status display control process in the agent of this invention.

FIG. 6 shows a flow chart of the status display control process of the agent in this invention.

At a step S21, it is always checked whether or not a display request, namely, a request for the write of display data into the virtual graphic 2 (14), exists from the application program (application software) under the T-OS reliability decision. In the presence of the request, the status display control process proceeds to a step S22.

At the step S22, the application program (application software) that made the display request (the write request into the virtual graphic 2) is inspected. Concretely, whether or not the application program is legal is checked in such a way that a signature affixed to the application program and issued by an organization relied on is read out, and the signature is compared with the hash value of the application software to be executed. The hash value of each application software element is measured by the agent 31 at the activation of the software element, and it is saved in the hash storage portion 61 of the TPM 6.

In the case of the signed application program, the agent 31 reads out a hash value from the signature and compares this hash value with the hash value saved in the TPM 6. When the hash values have agreed, the agent 31 returns an inspected result indicating that the application software is the signed normal one.

On the other hand, in a case where the application software is not the signed one, the agent 31 returns an inspected result indicating that the application software is not the normal one.

At a step S23, the hash value read out from the signature and the hash value read out from the TPM are checked. In a case where the inspected result is not normal, the process proceeds to a step S26, and in a case where the inspected result is normal, the process proceeds to a step S24.

In the case of the normal inspected result, identification information and color information are generated at the step S24 with reference to the agent policies shown in FIG. 4. Here, the "identification information" signifies, for example, an icon or a random numerical value which is displayed on the status display portion 51. The "color information" signifies, for example, which of the LEDs of the keyboard display portion 52 is lit up, the color of the LED, or a lighting-up pattern instruction for the LED.

In a case, for example, where the application software being legal on the T-OS has issued a message, data formed of the random numerical value is generated as the identification information in the light of the agent policies shown in FIG. 4. Besides, data formed of a continual lighting-up instruction for the trusted lamp is generated as the color information.

Subsequently, at a step S25, the generated identification information is transmitted to the virtual KBC 2 (15) and the virtual graphic 2 (14).

The identification information transmitted to the virtual KBC 2 is thereafter encrypted by the encryption portion 105 of the virtual KBC 2, so as to be delivered to the output unit 5 via the KBC chip 4.

On the other hand, the identification information transmitted to the virtual graphic 2 (14) is encrypted by the virtual graphic 2 so as to be written into the TFB 72.

Subsequently, at a step S28, it is checked whether or not the display request (write into the virtual graphic 2) made by the application software under the T-OS reliability decision has ended. In a case where the write has not ended, the process returns to the step S24, and similar processing is repeated. In a case where the transmission of the display request has fully ended, the process proceeds to a step S29.

At the step S29, the same processing as indicated at the step S24 is executed in order to reset the output unit S into a status where the legal application display does not exist. That is, identification information and color information are generated with reference to the inspected result and the agent policies.

Further, at a step S30, the same processing as at the step S25 is executed in order to reset the output unit 5 into the status where the legal application display does not exist. That is, the identification information is transmitted to the virtual KBC 2 and the virtual graphic 2.

After the step S30, the process returns to the step S21 so as to repeat the process thenceforth.

Besides, in the case where the inspected result is not normal at the step S23, the process proceeds to the step S26, at which identification information indicating that the inspected result is problematic is generated. By way of example, "!!APP!!" is generated as data which signifies that the application software under the T-OS reliability decision is problematic.

Here, the identification information contains, for example, an "!!APP!!" message and more detailed message data to be outputted to the display device 8.

In addition, at a step S27, the generated identification information is transmitted to the virtual KBC 2 and the virtual graphic 2.

The virtual KBC 2 having received the identification information generates a command for controlling the output unit 5, on the basis of the message in the identification information, and it issues the command to the KBC chip 4. Thus, the "!!APP!!" message is displayed on the output unit 5.

On the other hand, the virtual graphic 2 having received the identification information outputs the more detailed message to the TFB 72 on the basis of the message in the identification information.

After the step S27, the process returns to the step S21, and the same process is continued.

The above is one embodiment of the process of the agent.

In this manner, whether or not the application software under the T-OS reliability decision that made the display request is legal is inspected in the agent, so that even if any illegal software operated under the T-OS reliability decision is present, the illegal display request of the illegal software, or the like can be prevented from occurring.

<Description of Operating Flow of Virtual KBC 2>

Figure 7:
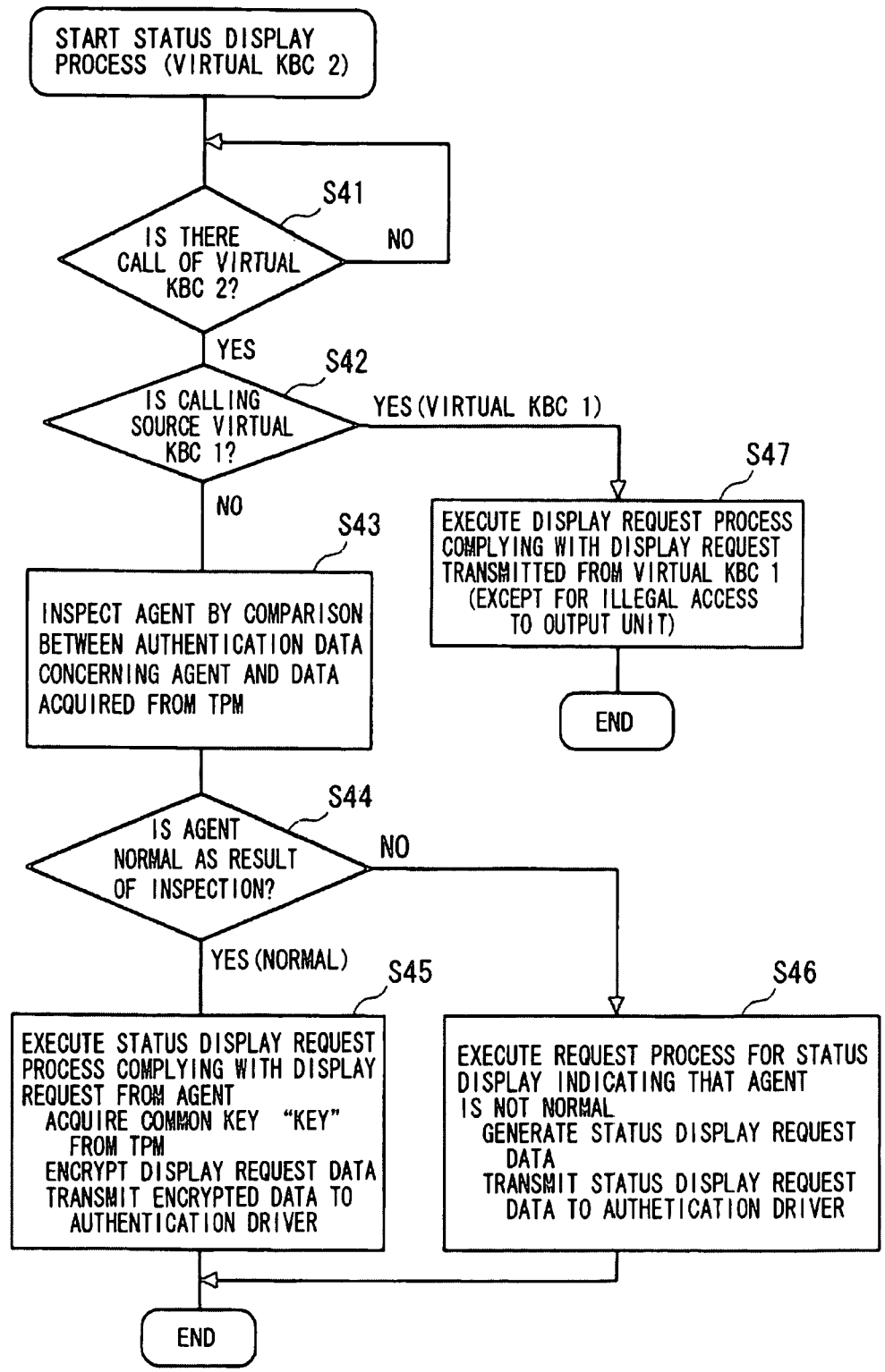
FIG. 7 is a flow chart of a status display process in the virtual KBC 2 of this invention.

FIG. 7 shows one embodiment of a flow chart concerning the status display process of the virtual KBC 2.

Here will be described the process in which a request source (transmission source) having transmitted a display request or the like request to the virtual KBC 2 is checked, and the output unit 5 is caused to present a status display corresponding to the content of the check.

As stated before, the request source (transmission source) to the virtual KBC 2 includes the two programs operated under the management of the conventional OS (2), and the program operated under management of the T-OS (3).

By way of example, one of the display requests is the display request which is ascribable to illegal application software operated under the management of the conventional OS (2), and this display request is given to the transmission portion 102 of the virtual KBC 2 through the virtual KBC 1 (13).

Besides, the other is the display request from the application software operated under the management of the T-OS (3), and this display request is given to the transmission portion 102 of the virtual KBC 2 through the agent 31 and the KBC driver 2 (34).

The transmission portion 102 checks a data content contained in the given display request, thereby to judge which of the OSes the display request has come from. Alternatively, in a case where the display request from the conventional OS and the display request from the T-OS are given from ports which are different in hardware fashion, which of the OSes the display request has come from is known by recognizing the port.

Assuming, for example, that an illegal display request from the virtual KBC 1 (13) to the T-OS frame 82 of the display device 8 has been made, such a display request is not acceptable, and hence, the subsequent processing needs to be stopped.

Besides, assuming that an illegal display request from the virtual KBC 1 (13) to the status display portion 51 of the output unit 5 has been made, such a display request is not acceptable, and hence, the subsequent processing needs to be stopped.

Further, in a case where a transmission request has been made from the agent 31 of the T-OS side to the virtual KBC 2, the agent itself might be pretended by illegal software, and hence, it needs to be checked that the agent 31 is not the illegal software.

In the ensuing process of the virtual KBC 2 as shown in FIG. 7, such illegal accesses are detected and prevented from occurring, and necessary status displays are presented on the output unit 5.

At a step S41 in FIG. 7, whether or not the virtual KBC 2 has been called is checked. The check is repeated until the virtual KBC 2 is called. Here, the "call for the virtual KBC 2" signifies a call from the KBC driver 2 (34) or a call from the virtual KBC 1.

By way of example, it is checked whether or not a display request has been made by the agent 31 under the T-OS reliability decision. As stated above, this is judged depending upon if the transmission portion 102 has received any request command from the virtual KBC 1 (13), or if it has received the command of the display request from the KBC driver 2 (34).

At a step S42, whether or not the calling source of the call having been made is the virtual KBC 1 (13) is judged.

In a case where the calling source is the virtual KBC 1 (13), the process proceeds to a step S47. In any other case, the call corresponds to the display request from the agent 31 of the T-OS side, and hence, the process proceeds to a step S43.

At the step S47, the data content of the display request command transmitted from the virtual KBC 1 is checked, and display request processing complying with the display request is executed. On this occasion, the data of a status display instruction is transmitted to the authentication driver 17.

However, among the display requests from the virtual KBC 1, the request for directly presenting a display on the output unit 5 is not acceptable, and hence, data making the request for such an illegal display on the output unit is neglected or deleted.

The data content of the display request sent from the virtual KBC 1 is formed of, for example, a flag indicative of the virtual KBC 1, a write destination address, and write data. The address among them is checked as to whether or not the display request is illegal. In a case where, as the result of the check, the address has been found to indicate the write into the output unit 5, the display request is judged to be illegal, and it is therefore discarded.

On the other hand, it is assumed that the data content sent from the virtual KBC 1 is formed of the flag indicative of the virtual KBC 1, an address indicative of any other than the output unit 5, and write data. Since, on this occasion, the display request from the virtual KBC 1 is normal, status display instruction data formed of, for example, the write address into the KBC chip 4 and the write data is generated and is transmitted to the authentication driver 17.

In a case, for example, where only a display request from normal application software under a conventional-OS reliability decision is existent and where a display request from software under the T-OS reliability decision is not present, identification information generated in conformity with the agent policies shown in FIG. 4 is kept retained at the end of the display request from the T-OS.

The authentication driver 17 having received the status display instruction data gives the display instruction directly to the KBC chip 4. Alternatively, the authentication driver 17 interprets the instruction and converts the instruction into a format capable of presenting a status display on the output unit 5, and it thereafter gives the display instruction to the KBC chip 4.

The KBC chip 4 controls the display on the output unit 5, in compliance with the given display instruction.

In the case, for example, where only the display request based on the application software under the conventional-OS reliability decision is present or existent and where the display request from the T-OS side is not existent, the KBC chip 4 performs the control so as to display nothing on the status display portion 51 (that is, display erase processing), or it causes the status display portion 51 to display the message of "Un-Trust" or a predetermined icon.

On the other hand, in a case where the display request from the agent 31 exists at the step S43, the authentication portion 103 determines whether the agent 31 is normal.

As stated before, the inspection of the agent by the authentication portion 103 is done by comparing the authentication data of the agent 31 as has been stored in the storage portion 106 beforehand and the hash value relevant to the agent 31 as has been acquired from the TPM 6. When the authentication data and the hash value have agreed, the inspection of the agent is successful (the agent is judged to be normal). When they have disagreed, it is judged that the agent 31 itself is not normal, and the authentication ends in failure.

In a case where the agent 31 has been judged normal at a step S44, the process proceeds to a step S45, and in a case where the agent 31 has been judged abnormal (the authentication has ended in failure), the process proceeds to a step S46.

At the step S45, the authentication portion 103 executes a status display request process which complies with the display request transmitted from the agent 31. This authentication portion 103 receives the display request data from the transmission portion 102, it encrypts the display request data, and it transmits the encrypted data to the authentication driver 17.

It is assumed, for example, that the display request transmitted from the agent 31 is data which contains a write address and identification information. From the address range of them, it is known that the display request is directed toward the status display portion 51 of the output unit 5.

In order to acquire a key "KEY" for the encryption, the authentication portion 103 issues a key acquisition request to the key exchange portion 104.

The key exchange portion 104 having received the key acquisition request outputs an instruction for outputting the common key "KEY", to the TPM 6. The TPM 6 confirms that the instruction is legal, and it outputs the common key "KEY" in case of the legal instruction. Thus, the authentication portion 103 acquires the key "KEY" stored in the key storage portion 62 of the TPM 6.

Thereafter, the authentication portion 103 gives the encryption portion 105 the acquired key "KEY" and the data content of the display request to-be-encrypted.

Incidentally, the key may well be acquired in such a way that the authentication portion 103 directly accesses the TPM 6 without the intervention of the key exchange portion 104.

The encryption portion 105 encrypts the data content of the display request with the key "KEY", and transmits the encrypted key to the authentication driver 17.

Thereafter, when the authentication driver 17 receives the encrypted display request data, it transmits the data to the KBC chip 4. When the KBC chip 4 receives the encrypted display request data, it restores the data by the decryption portion 41.

On this occasion, the common key "KEY" is acquired from the TPM 6 through the key acceptance portion 42, and the encrypted display request data is restored using the common key "KEY".

The restored display request data is converted into displayable status display information, which is thereafter outputted from the report output portion 43 to the output unit 5. In addition, the output unit 5 presents the status displays as requested, on the status display portion 51 and the keyboard display portion 52 on the basis of the status display information.

In a case, for example, where the display request from the application software of the T-OS to the T-OS frame 82 is existent and where the display requests of a random numerical value on the output unit 5 and the lighting-up of the trusted lamp from the agent 31 are existent, the random numerical value is displayed on the status display portion 51, and the trusted lamp disposed in the keyboard display portion 52 is lit up.

On the other hand, at the step S46, the processing of a request for a status display indicating that the agent 31 is abnormal (problematic) is executed because the agent 31 has been judged abnormal on this occasion. That is, status display request data for reporting the abnormality is generated by the authentication portion 103 and is encrypted by the encryption portion 105, and the encrypted data is transmitted to the authentication driver 17.

By way of example, data for displaying "!!OS!!" or the like message on the status display portion 51 is generated as the status display request data.

Thereafter, the authentication driver 17 transmits to the KBC chip 4, the status display request data which indicates that the agent 31 is abnormal.

The KBC chip 4 interprets the data, it converts the data into display data displayable on the status display portion 51, through the decryption portion 41, and it outputs the display data from the report output portion 43.

Thus, the status display from which it is known that the agent 31 is abnormal is presented on the status display portion 51, and the user can recognize such a fact that a screen currently displayed on the display device 8 is doubtful.

<Status Display Process of KBC Chip>

As stated before, the KBC chip 4 is an LSI which controls and monitors various ordinary input/output devices such as a keyboard and a mouse, and in this invention, it executes the status display control process for the output unit 5, in addition to the ordinary functions.

In the status display control process, as stated above, display data in the format displayed on the output unit 5 is generated on the basis of status display request data transmitted from the authentication driver 17, and the output unit 5 is controlled on the basis of the display data. In a case where the received status display request data has been encrypted, it is restored by acquiring the common key "KEY" from the TPM 6, whereupon the display data is generated so as to control the output unit 5.

However, in a case where a status display need not be presented on the output unit 5, it is also allowed to perform only the controls of the ordinary input/output devices and to stop the status display control process.

By way of example, it is also allowed that the KBC chip 4 is provided with a memory area for storing a VMM setting flag VF therein, and that only the controls of the ordinary input/output devices are performed when the value of the flag VF is "0", whereas the status display control process is activated when the value of the flag VF is "1".

The VMM setting flag VF is a flag for judging the existence or nonexistence of the execution of the status display control process.

The "case where the status display need not be presented" signifies, for example, an occasion where the T-OS is intentionally prevented from being activated.

The VMM setting flag VF may well be set at, for example, the start of the power source of the PC by the BIOS.

Immediately after the power source has been started, the BIOS is first activated, and it activates and initializes hardware devices incorporated using BIOS setting values, in succession.

Since the KBC chip 4 is also one of the hardware devices which are initialized, "0" or "1" may be set in the memory area of the VMM flag VF of the KBC chip 4 at the time of the initialization.

Meanwhile, the permission or prohibition of the activation of the T-OS is possible by the BIOS setting of the user. In a case where the T-OS is set so as to be activated, as the BIOS setting value, the BIOS sets the VMM flag VF of the KBC chip 4 at "1". On the other hand, in a case where the T-OS is set so as not to be activated, the BIOS sets the VMM flag VF of the KBC chip 4 at "0".

Figure 8:
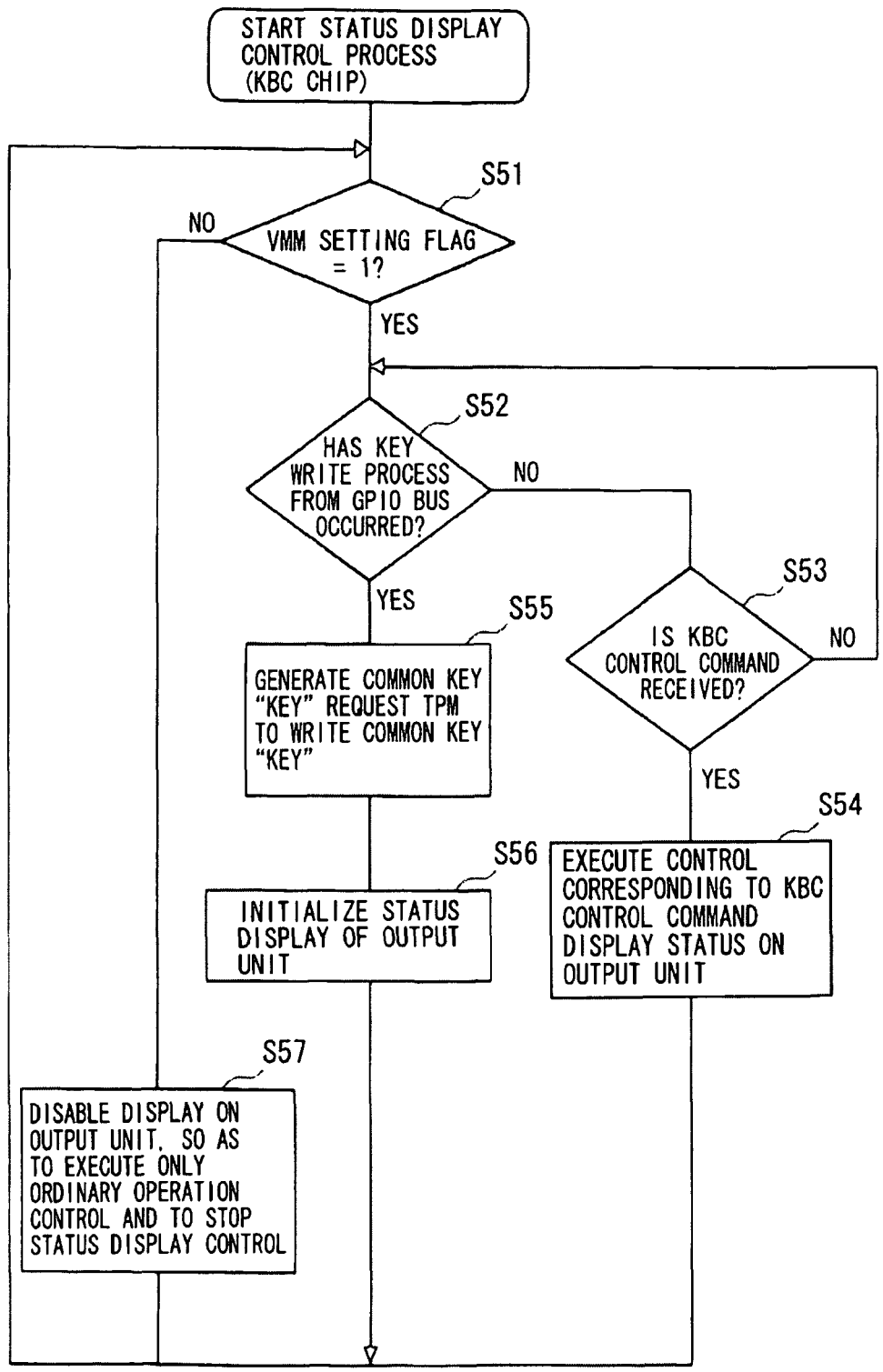
FIG. 8 is a flow chart of a status display control process in a KBC chip of this invention.

FIG. 8 shows a flow chart of one embodiment of the status display control process of the KBC chip 4.

First, at a step S51, it is confirmed whether or not the value of the VMM setting flag VF of the KBC chip 4 is "1". In case of the value of "1", the process proceeds to a step S52 in order to execute the status display control process.

On the other hand, in a case where the value is not "1" (for example, where it is "0"), the process proceeds to a step S57, at which display accesses to the status display portion 51, etc. of the output unit 5 are disabled in order to stop the status display control process, and only the operations of controlling and monitoring the ordinary input/output devices are performed. Thereafter, the process is returned to the step S51 and is repeated.

At the step S52, it is checked whether or not a key write process has occurred from the GPIO bus. Whether or not the key write process has occurred, is judged in such a way that the I/O pin of the KBC chip 4 connected with the TPM 6 by the GPIO bus is monitored so as to check the existence or nonexistence of an access. The existence or nonexistence of the access is retained in a register within the KBC chip 4. By way of example, "1" is retained in the existence of the access, and "0" is retained in the nonexistence.

The key write process occurs at, for example, the startup of the PC or the return from a sleep or inactive status.

In a case where the key write process has occurred, the process proceeds to a step S55, at which a common key "KEY" is generated, and a write request for the common key "KEY" is outputted to the TPM 6.

That is, the generation of the common key "KEY" is done by the virtual KBC 2 (15) as shown in FIG. 5 referred to before, in some cases, but it is done by the KBC chip 4 in the other cases. Irrespective of which of the virtual KBC 2 (15) and the KBC chip 4 has generated the common key "KEY", this common key "KEY" is saved in the TPM 6, and it thereafter becomes a key which is shared by the KBC chip 4 and the virtual KBC 2 (15).

At a step S56, a status which is displayed on the status display portion 51 or keyboard display portion 52 of the output unit 5 is initialized.

In a case, for example, where a display (!!VMM!!) or the like indicating the occurrence of an abnormality in the VMM 1 is presented on the status display portion 51, this display is erased.

Thereafter, the process is returned to the step S51 and is repeated.

In a case where the key write process has not occurred at the step S52, the process proceeds to a step S53, at which time whether or not a KBC control command is received from the authentication driver 17 is checked. The "KBC control command" also contains the status display request data transmitted from the authentication driver 17.

In a case where the KBC control command is not received, the process is returned to the step S52 and is repeated.

On the other hand, in a case where the KBC control command has been received, the process proceeds to a step S54, at which point a control corresponding to the received KBC control command is performed. Thereafter, the process is returned to the step S51 and is repeated.

At the step S54, in a case, for example, where the status display request data has been received from the authentication driver 17, the content of the data is interpreted, the data is decrypted at need as stated before, and a status display control for the output unit 5 is performed.

Besides, when the register value indicative of the existence or nonexistence of the access from the GPIO bus within the KBC chip 4 indicates the nonexistence of the access, identification information indicating the occurrence of the abnormality in the VMM 1 is displayed on the output unit 5. In a case, for example, where write data into the output unit 5 from the authentication driver 17 has been received under the condition that "0" indicating the nonexistence of the access from the GPIO bus connected with the TPM 6 is retained in the register within the KBC chip 4, the illegal activation of the VMM 1 is judged. Then, display data which displays on the status display portion 51, the status display ("!!VMM!!") indicating the existence of the abnormality in the VMM 1 is generated, and it is transmitted to the output unit 5.

By the way, in the case where the VMM setting flag VF is "1", the KBC chip 4 shall accept only the KBC control command relevant to the status display request, and the KBC control command for controlling the ordinary input/output devices may well be neglected or be processed as an abnormality even when accepted. In this case, assuming that the KBC control command for controlling the ordinary input/output devices has been received at the flag VF=1, a status display indicating the existence of the abnormality in the VMM 1 may well be presented at the step S54.

Hereinbelow, practicable examples of the display control of the status display will be described.

DISPLAY EXAMPLE 1

Case of Normal Operation

Here will be illustrated a case where a display request onto the T-OS frame 82 of the display device 8 has been made by a legal application program operated under the management of the T-OS, and where a status display request has been made from the agent 31.

FIG. 9 shows an explanatory diagram of this display example 1.

The status display of the output unit 5 shows a case where the display request based on the normal application software from the T-OS is existent, and where a display request from normal application software under the management of the conventional OS is also existent.

On this occasion, a No. (here, "492") which signifies that a display based on the normal software under the T-OS reliability decision is displayed on the status display portion 51, and the lighting-up of the trusted lamp, which signifies that a screen displayed on the T-OS frame 82 is a display based on the normal software under the T-OS reliability decision, is performed on the keyboard display portion 52.

This example exemplifies a case where no illegal software is existent. Here, display data requested from the application software under the conventional-OS reliability decision is expanded in the UTBF 71 within the display memory area 70, and it is displayed within the conventional-OS frame 81 of the display device 8.

On the other hand, display data requested from the application software under the T-OS reliability decision is expanded in the TBF 72 within the display memory area 70, and it is displayed within the T-OS frame 82 of the display device 8.

Besides, when the display request is made by the application software under the T-OS reliability decision, the agent 31 checks the signature of this application software at the step S22 in FIG. 6. When the application software is judged to be normal, by the confirmation of the signature, the identification information is generated at the step S24 in FIG. 6.

In addition, the agent 31 transmits the identification information to the virtual KBC 2 and the virtual graphic 2 (step S25).

Thereafter, the virtual KBC 2 inspects the agent 31 as indicated at the step S43 in FIG. 7. In the inspection, the two data concerning the agent are compared as stated before.

In the case of the display example 1 in FIG. 9, assuming that the agent is also normal, the status display request process at the step S45 is executed.

Here, the display request data to be sent to the KBC chip 4 is created on the basis of the identification information, and it is sent to the authentication driver 17 after having been encrypted.

In the case of the display example 1 in FIG. 9, the display request data contains, for example, a numerical value generated at random and an instruction for lighting up the trusted lamp.

The encrypted display request data is sent from the authentication driver 17 to the KBC chip 4. When the data is judged to be one of the KBC control commands, at the step S53 in FIG. 8, it is decrypted, and the status display is thereafter presented on the output unit 5 on the basis of the information in the display request data (step S54).

In the case of FIG. 9, the numeral "492" is displayed on the status display portion 51 on the basis of the numerical value generated at random and contained in the display request data. Also, the trusted lamp of the keyboard display portion 52 is lit up on the basis of the lighting-up instruction for the trusted lamp as is contained in the display request data.

DISPLAY EXAMPLE 2

Case of Normal Operation

Here will be illustrated a case where a display request based on a legal application program operated under the management of the T-OS is not existent, and where a display request based on normal application software from the conventional OS is existent.

FIG. 10 shows an explanatory diagram of this display example 2.

On this occasion, nothing is displayed on the status display portion 51. In other words, any display is erased. Thus, it is indicated on the T-OS frame 82 of the display device 8 that any display based on the normal software under the T-OS reliability decision is not presented.

Besides, the trusted lamp of the keyboard display portion 52 is put out.

More specifically, when the display of the output unit 5 is not existent, any display request based on the software under the T-OS reliability decision ought not to be currently existent. Therefore, in a case where the T-OS frame 82 is displayed on the display device 8 and where a screen is displayed within this frame, it can be considered that the display will be an illegal display which is ascribable to the installation of any illegal software in any place.

Referring to FIG. 10, since any data which is displayed by the application software operated under the management of the T-OS is not existent, nothing is expanded in the TBF 72 of the display memory area 70. Accordingly, the T-OS frame 82 is not displayed on the display device 8, and any screen displayed therein is not existent, either.

In the existence of the normal display request from the conventional OS, the display data thereof is expanded in the UTBF 71, and the display device 8 merely displays the display data within the conventional-OS frame 81.

In this display example 2, the display request is not made by the application software under the T-OS reliability decision, and hence, the agent 31 repeats the processing of the step S21.

On the other hand, the display request is made by the application software of the conventional OS, and hence, the virtual KBC 2 is called through the virtual KBC 1 by this display request (step S42 in FIG. 7).

In this case, display request data which is formed of a flag indicative of the virtual KBC 1, a write destination address and write data is sent from the virtual KBC 1 to the virtual KBC 2 by way of example.

At the step S47 in FIG. 7, the virtual KBC 2 creates status display instruction data on the basis of the write destination address and the write data of the display request data.

In the case of the display example 2 in FIG. 10, there is created the instruction data which signifies that the display of the status display portion 51 is erased, and that the trusted lamp of the keyboard display portion 52 is put out. In addition, the instruction data is transmitted to the KBC chip 2 through the authentication driver 17.

In the KBC chip 4, the received instruction data is judged to be one of the KBC control commands, and a status display control based on this instruction data is performed at the step S54 in FIG. 8. Thus, the display of the display example 2 as shown in FIG. 10 is presented on the output unit 5.

DISPLAY EXAMPLE 3

Here will be described a case where illegal software is operating under the management of the conventional OS, and where a display request is not made by any application under the T-OS reliability decision. It is assumed that the illegal software pretends to be the T-OS frame 82, and that it presents an illegal display within the T-OS frame 82, together with the display of this T-OS frame 82.

Figure 11:
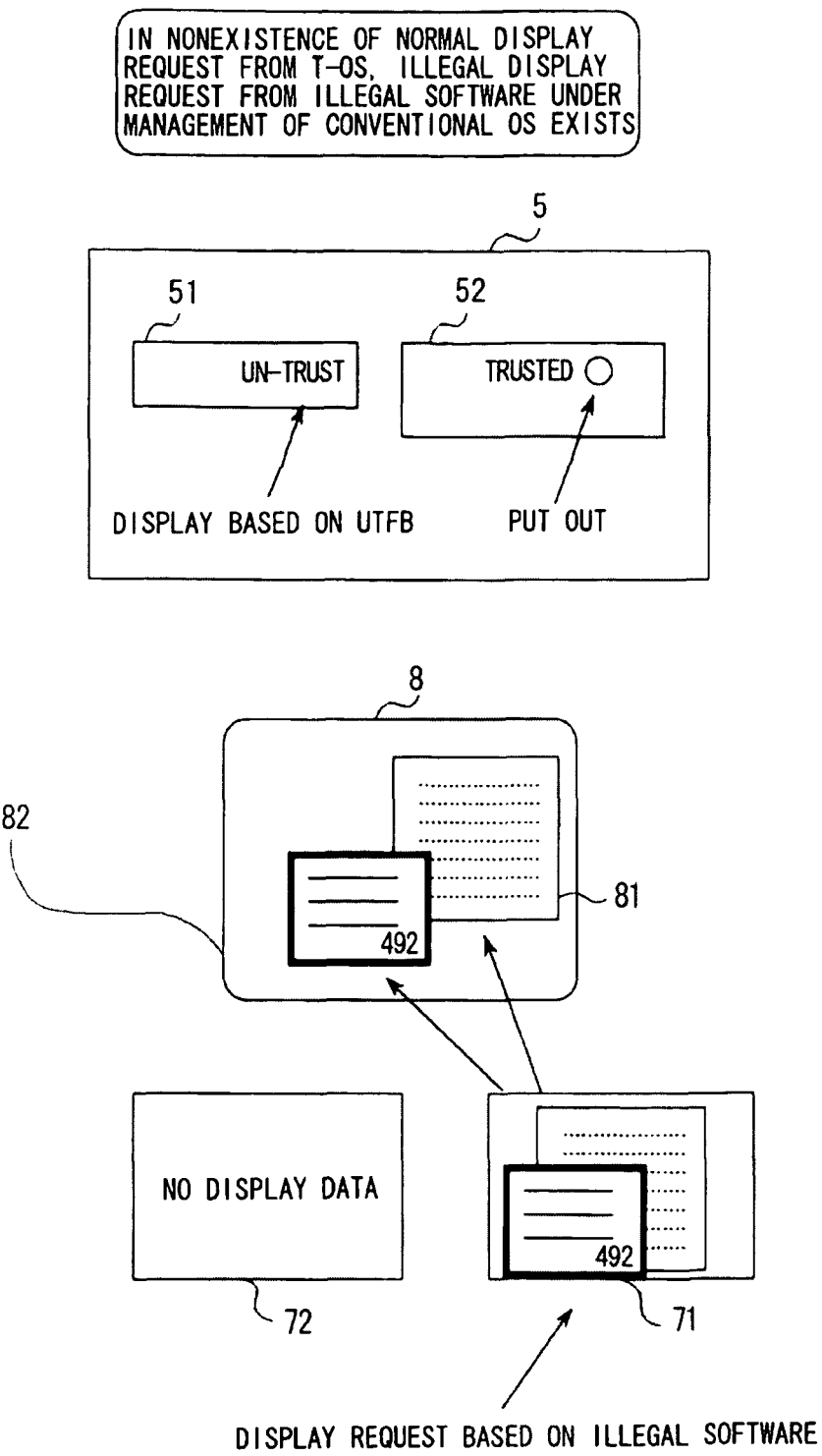
FIG. 11 is an explanatory diagram of a display example 3 of the status display of this invention.

FIG. 11 shows an explanatory diagram of the display example 3.

In the display example 3, as shown in FIG. 11, a character string "Un-trust" is displayed on the status display portion 51, and the trusted lamp of the keyboard display portion 52 is put out.

The display "Un-trusted" of the status display portion 51 signifies that the display request from the T-OS is not existent currently, that a display request from the conventional OS is existent, and that display data expanded in the UTBF 71 is displayed on the display device 8.

Besides, the putting-out of the trusted lamp of the keyboard display portion 52 indicates that, in the same manner as in FIG. 10, since the display request from the T-OS is not existent, display data based on normal application software under the T-OS reliability decision is not existent, so the T-OS frame 82 ought not to be displayed, and display data ought not to be displayed within the T-OS frame 82, either.

Also in this display example 3, if display data ascribable to the display request from the illegal application software under the conventional-OS reliability decision is expanded in the UTBF 71 as shown in FIG. 11, the display device 8 will display a screen as if both the conventional-OS frame 81 and the T-OS frame 82 were displayed and as if display data were displayed within both the display frames.

When the user merely glances at the screen of the display device 8, he/she sometimes fails to know that the illegal display is presented on the illegal T-OS frame 82.

In the case of the display example 3, however, when the user looks at the two status displays of the output unit 5, he/she can know that the T-OS frame 82 and the display content thereof are not displayed by normal application software. Therefore, when the user confirms the status displays, he/she can be prevented from carelessly inputting important private data or the like to the screen displayed in the false T-OS frame 82.

In the case of the display example 3, any display request from the T-OS is not existent, so that the agent 31 repeats the step S21 in FIG. 6.

On the other hand, the display request from the application software under the conventional-OS reliability decision is existent, so that the virtual KBC 2 judges at the step S42 in FIG. 7 that there is a call from the virtual KBC 1, and it executes the processing of the step S47.

In the case of this display example 3, the agent 31 can know by monitoring the application software, that the display request from the T-OS is not existent, and that only the display request from the conventional OS is existent. Therefore, the agent 31 creates status display instruction data which signifies displaying the character string "Un-trust" on the status display portion 51 and putting out the trusted lamp of the keyboard display portion 52, and it transmits the instruction data to the authentication driver 17.

Thereafter, the status display instruction data is transmitted to the KBC chip 4 through the authentication driver 17. The processing of the steps S52, S53 and S54 in FIG. 8 is executed in the KBC chip 4, and the status display as shown in FIG. 11 is presented on the output unit 5.

DISPLAY EXAMPLE 4

Here will be described a case where any display request based on normal application software from the T-OS is not existent, where an illegal software module SM exists in the VMM 1, and where the software module SM displays the T-OS frame 82 on the display device 8 and a screen within this frame by utilizing the TFB 72.

Besides, it is assumed that a display request based on normal application software from the conventional OS is existent. In the nonexistence of the display request, however, the display of the output unit 5 is the same as in this display example 4 except the point of difference that no display is presented in the conventional-OS frame 81.

Figure 12:
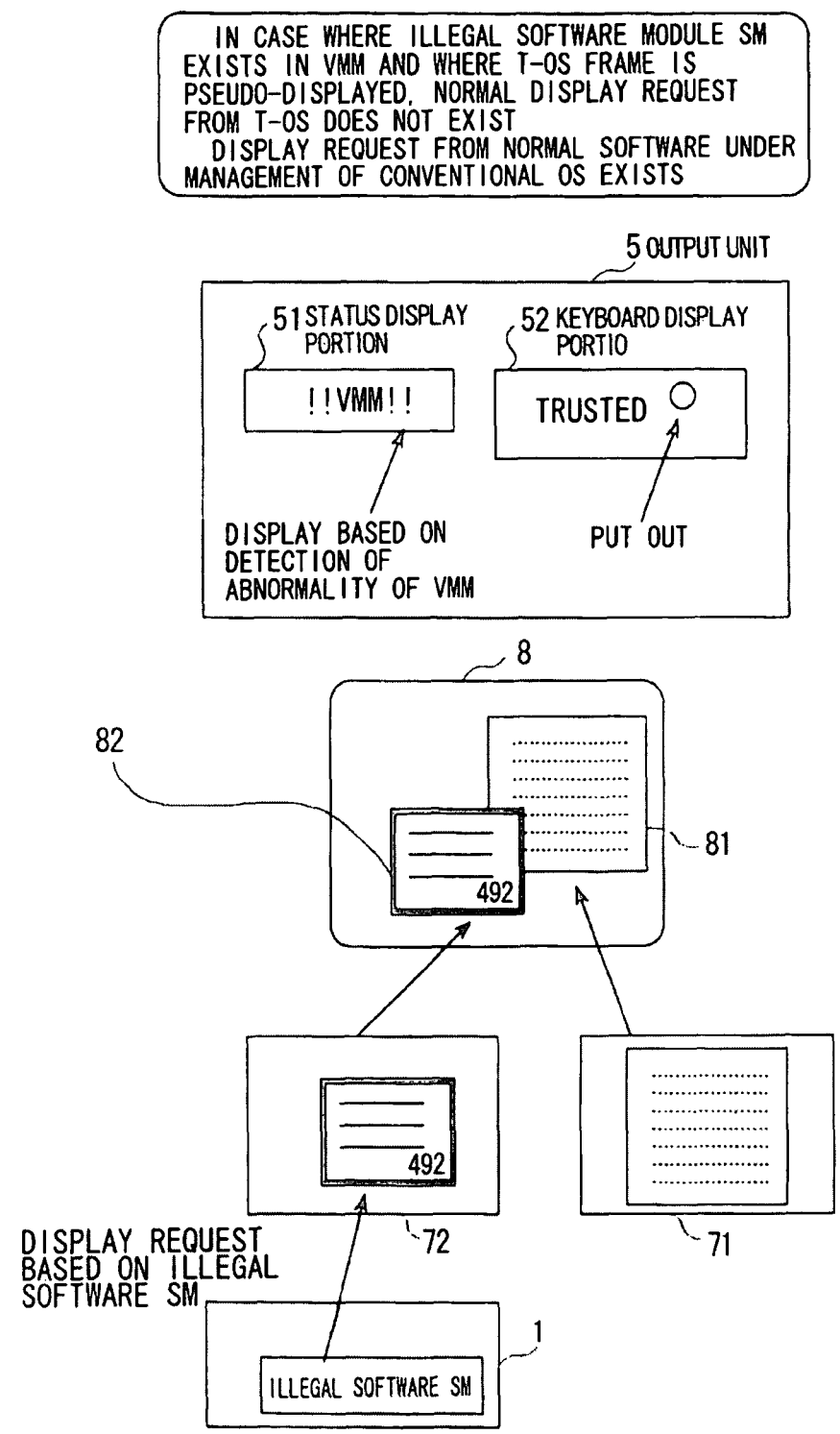
FIG. 12 is an explanatory diagram of a display example 4 of the status display of this invention.

FIG. 12 shows an explanatory diagram of the display example 4.

In this case, a message "!!VMM!!" indicating that an abnormality has occurred in the VMM 1 is displayed on the status display portion 51, and the trusted lamp of the keyboard display portion 52 is put out.

On this occasion, when the user looks at the display content of the status display portion 51, he/she knows that the VMM 1 is abnormal. Accordingly, the user knows that a screen currently displayed on the display device 8 cannot be relied on, and he/she can be prevented from inputting important data.

It is assumed that such an illegal software module SM is not included in the VMM 1 at the shipment of the PC or the first startup process thereof.

Besides, in the display example 4, it is considered that the illegal software module SM exists in the VMM 1, and that the software module SM has been mixed in during the user's operation after the shipment.

Then, the existence of the illegal software module SM can be detected when the VMM 1 is activated after the startup of the PC, whereby the virtual KBC 2 executes the key exchange process (FIG. 5).

More specifically, when the key write request has been issued to the TPM 6 at the step S11 in FIG. 5, the existence of the illegal software module SM is detected by the legality check of the write instruction proceeding within the TPM 6.

As stated before, in the check, the hash value of the VMM 1 previously stored in the TPM 6 before the shipment is used in order to judge if the write instruction from the virtual KBC 2 of the VMM 1 is legal.

In a case where the illegal software module SM is not existent in the VMM 1, the hash value of the VMM measured by the BIOS agrees with the hash value of the VMM stored in the TPM beforehand. However, in the case where the illegal software module SM has been mixed into the VMM 1, the hash value of the VMM measured by the BIOS becomes different from the hash value of the VMM stored in the TPM beforehand.

Accordingly, the two hash values fail to agree, and hence, it is notified by the check of the TPM 6 that the write instruction is not permitted. That is, at the step S12 in FIG. 5, it is detected that the write into the TPM has not been permitted, so that the key exchange process proceeds to the step S14, at which time the processing in the case of the unpermission of the write is executed.

In the processing of the step S14, the virtual KBC 2 generates the information indicating that the abnormality has occurred in the VMM 1, so the access to the TPM has been rejected, and it transmits the information to the display device 8 via the display driver 16.

On the other hand, the KBC chip 4 falls into a state where, notwithstanding that the VMM setting flag indicating the activation of the VMM 1 by the BIOS is "1", the access from the VMM 1 through the GPIO bus of the TPM is not made. This KBC chip 4 having received the command for initializing the KBC, in that state, generates the display data so as to display the message "!!VMM!!" on the status display portion 51 of the output unit 5, and it gives the display data to the output unit 5.

Besides, since the response of the unpermission is received from the TPM in this case, it is known that the VMM 1 is not normal. Eventually, whether or not the display request from the T-OS is legal is unknown, so that the trusted lamp of the keyboard display portion 52 should preferably be put out.

DISPLAY EXAMPLE 5

Here will be described a case where the agent 31 operated under the management of the T-OS is illegal software, and where a display request from the illegal agent is existent. Besides, it is assumed that a display request from normal software under the management of the conventional OS is existent.

Figure 13:
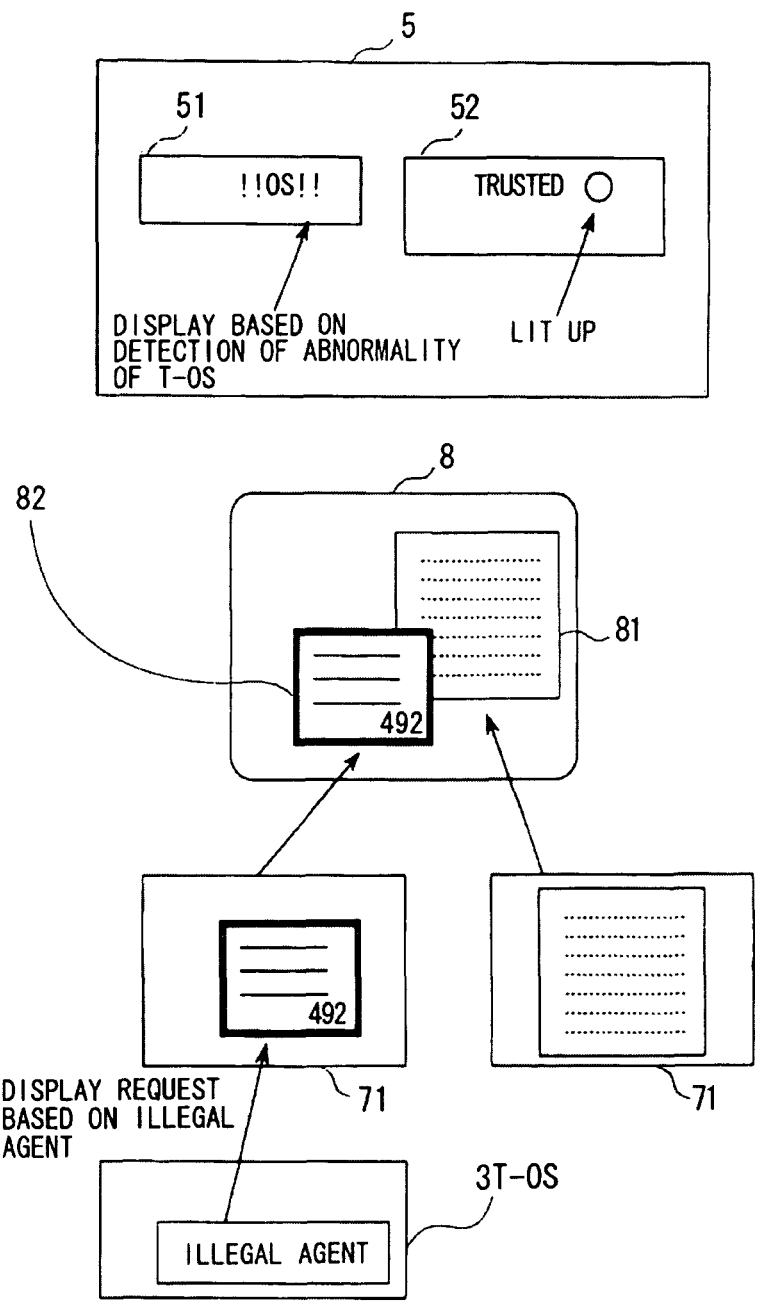
FIG. 13 is an explanatory diagram of a display example 5 of the status display of this invention.

FIG. 13 shows an explanatory diagram of the display example 5.

In this case, the software on the T-OS side is abnormal, and hence, a display (for example, "!!OS!!") indicating that the abnormality of the T-OS has been detected is presented on the status display portion 51.

Besides, although the agent managing the display of the T-OS side is illegal, display data based on the display request thereof is displayed in the T-OS frame 82 through the TBF 72, and hence, the trusted lamp of the keyboard display portion 52 is lit up.

As shown in FIG. 13, assuming that the agent 31 operates as if it were a normal agent, in spite of the illegal software, the display request from the illegal agent 31 is accepted, and the display data given by this display request is expanded in the TBF 72.

Consequently, the display data expanded in the TBF 72 is displayed within the T-OS frame 82. In this case, however, a screen displayed in the T-OS frame 82 may possibly be an illegal display because it is based on the display request from the illegal agent.

In this display example 5, the user can recognize the occurrence of the abnormality in the T-OS by confirming the display content "!!OS!!" displayed on the status display portion 51.

Accordingly, the user can know that the display content of the T-OS frame might be illegal, so that he/she can be prevented from inputting important data to the illegal display screen displayed within the T-OS frame.

In the case of the display example 5, it can be detected that the agent 31 is not normal, by the inspection of the agent at the step S43 in FIG. 7.

In the case where the agent 31 is the illegal software, it differs from the agent 31 which is activated at the shipment and initial startup of the PC.

Accordingly, the agent 31 at the shipment or the like is regular, and assuming that authentication data corresponding to the regular agent is stored in the storage portion 106 of the virtual KBC 2 beforehand, the hash value of the agent 31 measured by the TPM may possibly become different from the authentication data after the illegal agent 31 operated under the T-OS reliability decision has been mixed in.

Therefore, in the case where the agent 31 has been judged to be abnormal, at the step S44 in FIG. 7, the processing of the step S46 is executed.

Owing to the processing, the message indicating the abnormality of the agent is generated by the authentication portion 103, and the message is encrypted by the encryption portion 105, so as to transmit the encrypted message to the KBC chip 4. Consequently, the display as shown in the display example 5 in FIG. 13 is presented.

DISPLAY EXAMPLE 6

Here will be described a case where an application program operated under the management of the T-OS is illegal software, and where an illegal display request has been made by the application program.

Besides, it is assumed that a display request from normal software operated under the management of the conventional OS is existent.

Figure 14:
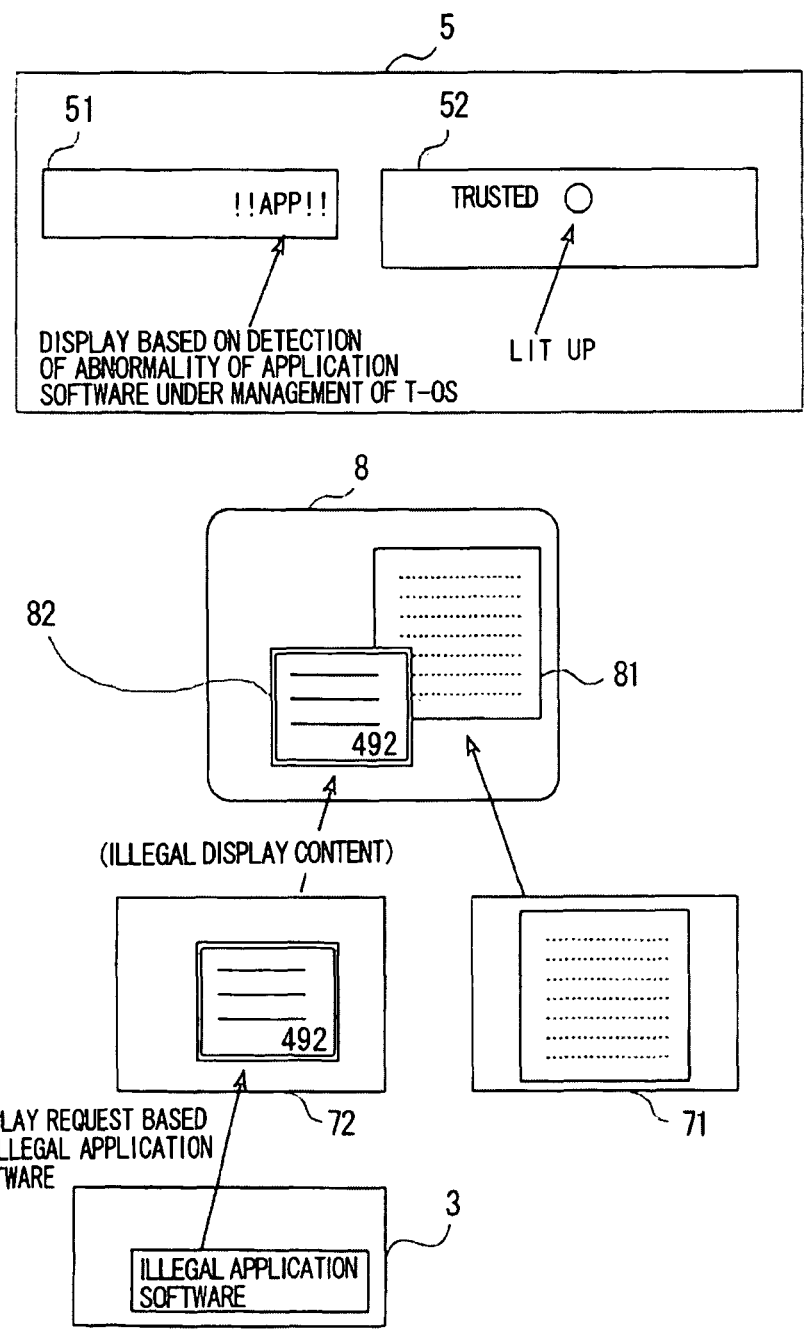
FIG. 14 is an explanatory diagram of a display example 6 of the status display of this invention.
Figure 15:
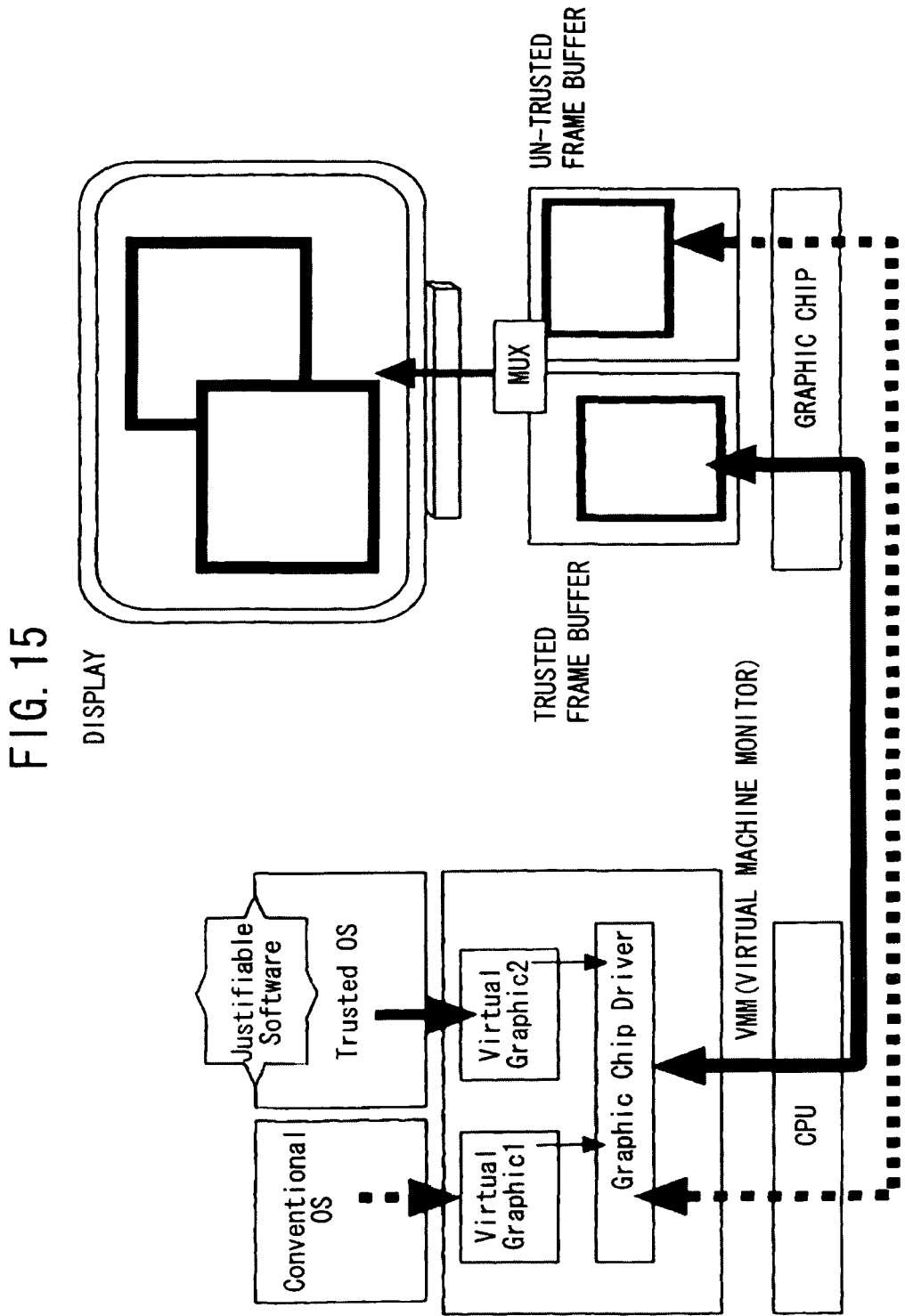
FIG. 15 is an explanatory diagram of the schematic configuration of a related art security system.
Figure 16:
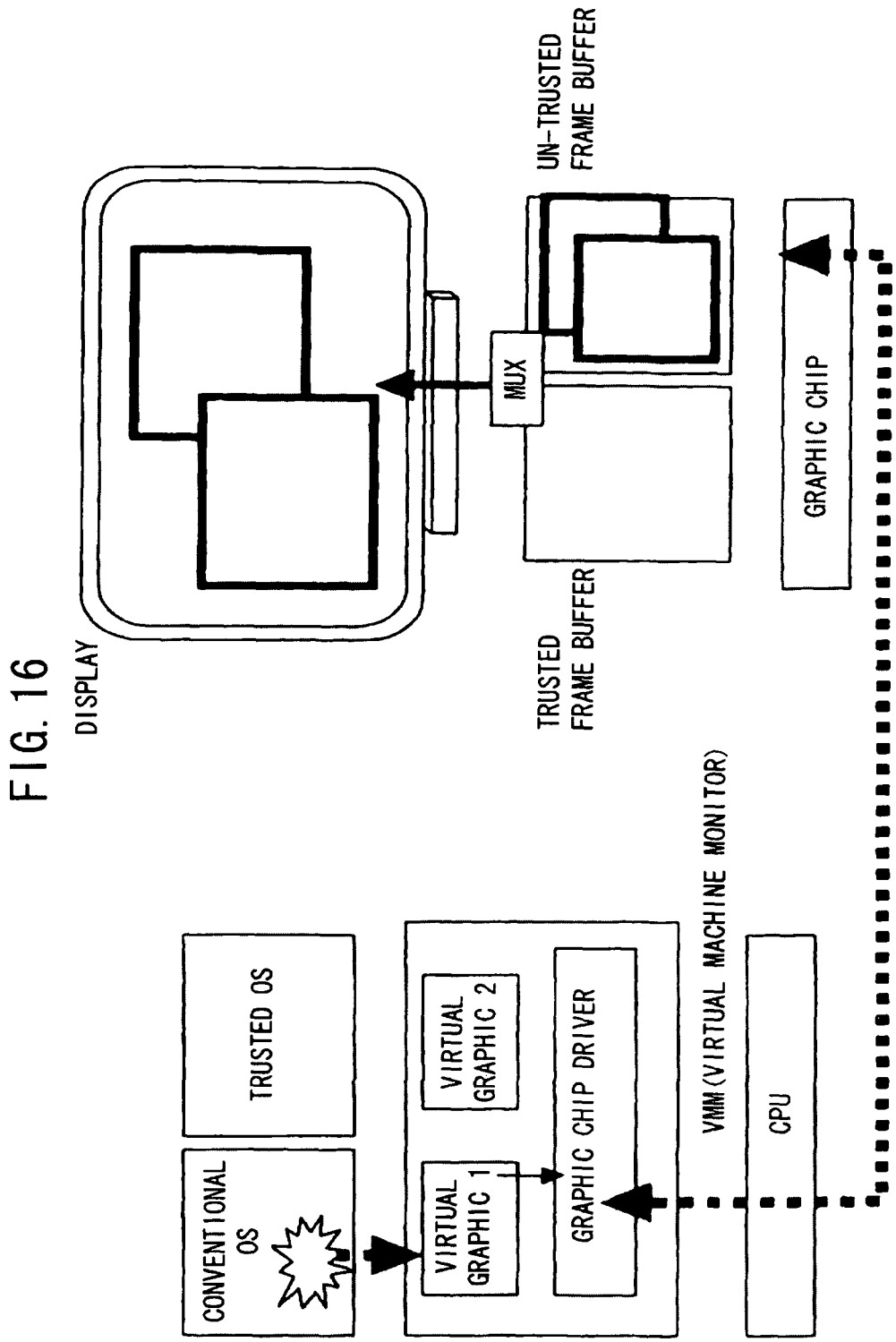
FIG. 16 is an explanatory diagram of an illegal display status ascribable to illegal software, in the related art system.

FIG. 14 shows an explanatory diagram of the display example 6.

In this case, a status which is displayed on the output unit 5 is similar to the status of the display example 5. However, character information which is displayed on the status display portion 51 is different.

It is known by the inspection of the agent (the step S22 in FIG. 6) that the application software under the management of the T-OS is not normal. Therefore, a display "!!APP!!", for example, is presented as shown in FIG. 14.

Besides, assuming that the agent 31 is legal software, a display request from the agent is also legal, and hence, display data to be displayed in the T-OS frame 82 is expanded in the TBF 72. Accordingly, the trusted lamp of the keyboard display portion 52 is lit up.

Also in the case of this display example 6, the user can know the existence of the illegal software by confirming the warning display "!!APP!!" of the status display portion 51, and he/she can be prevented from inputting important data to the illegal screen display.

In the case of this display example 6, the illegal display request is issued from the illegal application program to the agent 31. The agent 31 does not know whether or not the display request itself is illegal, but it executes the processing of the step S22 in FIG. 6 upon accepting this display request.

That is, the agent 31 executes the inspection of the application software having made the display request. In addition, the hash value of the application software is read out from the TPM 6 so as to check the signature as stated before, whereby the agent checks whether or not the application software having made the display request is normal.

When it has been found out that the hash value relevant to the application software as is stored in the TPM 6 and the hash value within the signature do not agree, the result of the check becomes that the application software is not normal. Therefore, the agent executes the processing of the steps S26 and S27.

At the step S26, there is generated the identification information indicating that the application software having made the display request is not normal. By way of example, the identification information is formed of the warning message "!!APP!!", the details of this warning message, the write address into the output unit 5, etc.

In addition, at the step S27, the generated identification information is transmitted to the virtual KBC 2.

The virtual KBC 2 having received the identification information from the agent 31 proceeds from the step S42 in FIG. 7 to the step S43, at which point the agent is inspected.

Assuming that the agent 31 is normal, the virtual KBC 2 proceeds from the step S44 to the step S45, at which time the status display request process is executed. Since, on this occasion, the display request from the agent contains the warning message "!!APP!!" and the data of the write address into the output unit 5, etc., display data for presenting a status display as shown in FIG. 14 is generated and is transmitted to the KBC chip 4.

Thus, the status display as shown in FIG. 14 is presented on the output unit 5.

Although the several status display examples of this invention have been mentioned in the above, this invention is not limited to these examples.

It is considered that illegal software elements will intrude into all the functional blocks in various other aspects. However, when the process of the status display by the agent, the virtual KBC 2 or the like as stated above is executed, the existence of any abnormality can be reported to the user by the status display presented on the output unit 5.

The user confirms the status display on the output unit 5, whereby even when a display which seems to be legal is presented on the display device 8, the user can be prevented from inputting important data.

What is claimed is:

1. An apparatus comprising:
   a processor which executes a procedure comprising,
   a first operating system (OS) and a trusted second OS, each executing a process and outputting a display request for displaying a result of the execution of the process, the first OS managing operations of application programs, and the trusted second OS managing operations of a group of software elements whose reliability have been confirmed by a security device independently of the first OS;
   the first OS and the trusted second OS causing a display device to output display data that indicates a drawing screen complying with the display request;
   deciding a legality of a transmission source of the display request based on a judgment as to which of the first OS and the trusted second OS the display request to display the display data on a frame for the trusted second OS is requested from, and making an output request for information capable of confirming a reliability of the display data on the basis of a result of the decision; and
   the trusted second OS outputting the information capable of confirming the reliability of the display data complying with the output request, separately from the display data.

2. An apparatus claimed as claim 1, wherein:
   judgment information serving as a criterion for deciding the legality of the transmission source of the display request is stored beforehand in a reliability information management portion; and when the display request has been accepted, the legality of the transmission source of the display request is decided on the basis of a hash value that specifies a functional module concerning the transmission source of the display request, and the judgment information that is stored in the reliability information management portion.

3. An apparatus claimed as claim 2, wherein the judgment information is stored in a tamper-resistant chip.

4. An apparatus claimed as claim 2, wherein the transmission source of the display request is determined to be legal in a case where the hash value which specifies the functional module concerning the transmission source of the display request has agreed with the judgment information which is stored in the reliability information management portion.

5. A program stored on a non-transitory computer storage medium, the program causing a computer to perform operations, the operations comprising:
  a basic function management operation controlled by a first operating system (OS) and a trusted second OS, each OS executing a process and outputting a display request for displaying a result of the execution, the first OS managing operations of application programs, and the trusted second OS managing operations of a group of software elements whose reliability have been confirmed by a security device independently of the first OS;
  a data display operation controlled by the first OS and the trusted second OS causing a display device to output display data which indicates a drawing screen complying with the display request;
  a reliability decision operation deciding a legality of a transmission source of the display request based on a judgment as to which of the first OS and the trusted second OS the display request to display the display data on a frame for the trusted second OS is requested from, and issuing an output request for information with which a reliability of the display data that the data display operation causes the display device to output can be confirmed, on the basis of a result of the decision; and
  an output operation controlled by the trusted second OS and outputting the information with which the reliability of the display data can be confirmed, concerning the output request of the reliability decision operation, separately from the display data which is outputted by the data display operation.

6. An apparatus claimed as claim 1, wherein when the display request to display the display data on the frame for the trusted second OS is transmitted by the first OS, the transmission source of the display request is determined to be illegal.

7. An apparatus claimed as claim 5, wherein when the display request to display the display data on the frame for the trusted second OS is transmitted by the first OS, the transmission source of the display request is determined to be illegal.

* * * * *